United States Patent [19]

Evelyn-Veere et al.

[11] 4,176,395
[45] Nov. 27, 1979

[54] INTERACTIVE IRRIGATION CONTROL SYSTEM

[75] Inventors: Rene H. Evelyn-Veere, Torrance; Richard L. Ruggles, Mount Baldy, both of Calif.

[73] Assignee: Clemar Manufacturing Corporation, Azusa, Calif.

[21] Appl. No.: 852,023

[22] Filed: Nov. 16, 1977

[51] Int. Cl.² .............. G06F 15/56; G05B 11/00; A01G 25/16
[52] U.S. Cl. .............. 364/420; 137/624.11; 239/69; 307/141.4; 364/104; 364/120; 364/900; 364/510
[58] Field of Search ............ 364/420, 400, 104, 120, 364/100, 103, 107, 479, 509, 510, 900 MS File, 200 MS File; 137/624.11, 624.12, 624.13, 624.16, 624.18, 624.19, 624.2; 239/69, 70; 340/309.1, 309.3, 309.4, 310 R, 150, 151; 307/141, 141.4, 141.8, 41

[56] References Cited

U.S. PATENT DOCUMENTS

| | | | |
|---|---|---|---|
| 3,217,188 | 11/1965 | Bauer | 137/624.11 X |
| 3,440,434 | 4/1969 | Yates et al. | 137/624.2 X |
| 3,599,867 | 8/1971 | Griswold et al. | 239/70 X |
| 3,741,246 | 6/1973 | Braytenbah | 137/624.11 |
| 3,969,722 | 7/1976 | Danco et al. | 364/200 |
| 3,975,622 | 8/1976 | Horn et al. | 364/120 X |
| 4,006,464 | 2/1977 | Landell | 364/120 X |
| 4,015,366 | 4/1977 | Hall | 239/69 X |

FOREIGN PATENT DOCUMENTS 973273  8/1975  Canada ...................... 364/104

*Primary Examiner*—Joseph F. Ruggiero
*Attorney, Agent, or Firm*—Fulwider, Patton, Rieber, Lee & Utecht

[57] ABSTRACT

An irrigation control system and a related method for controlling a large number of valves in accordance with a plurality of schedules of instructions provided by the user of the system. Schedules of instructions may be created or modified during normal operation of the system by utilizing a variety of command sequences on a keyboard and display device, and schedules may also be reviewed or monitored during operation. The control system includes apparatus for processing a plurality of digital inputs by means of which the conditions of sensing devices located in the field are monitored and can be used to condition execution of the schedules of instructions. The control system is disclosed for use with a two-wire irrigation system in which on/off control signals are encoded into a power signal for transmission along a pair of wires to which decoding units are connected. The control system includes an input-/output service module which transmits on/off control signals to the decoding units repeatedly, as rapidly as the two-wire system will permit, to ensure that the valves remain switched in the manner intended.

27 Claims, 35 Drawing Figures

Fig. 8a (a.c.)
Fig. 8b (φc) ∅ 1 2 3 4 5 6 7 8 ∅ 1 2
Fig. 8c (φd) 1 2 3 4 5 6 7 8 FB ∅ 1 2
Fig. 8d (φDS) 1 2 3 4 5 6 7 8 (FB STROBES)
Fig. 8g (FB+LD) DATA FB CLEAR LD
Fig. 8e (FB) AT POWER ON START (POR >150 ms)
BUSY-CLEAR
FB LATCH
Fig. 8f (LD) PARA LOAD

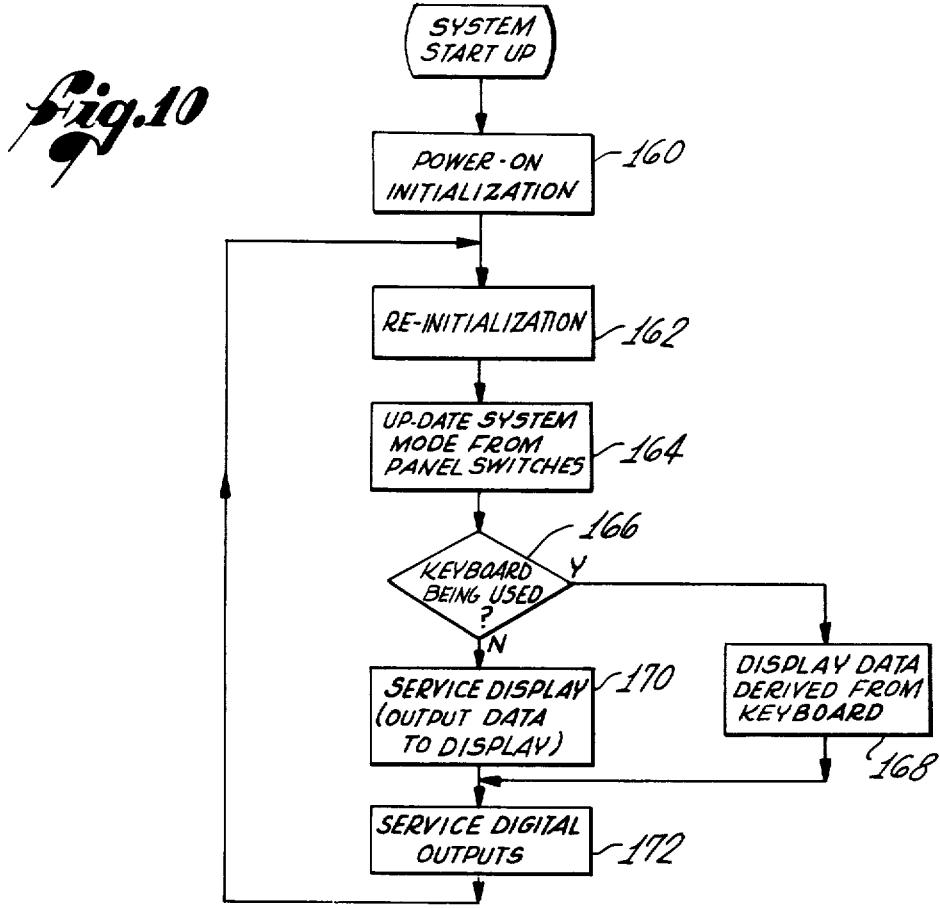
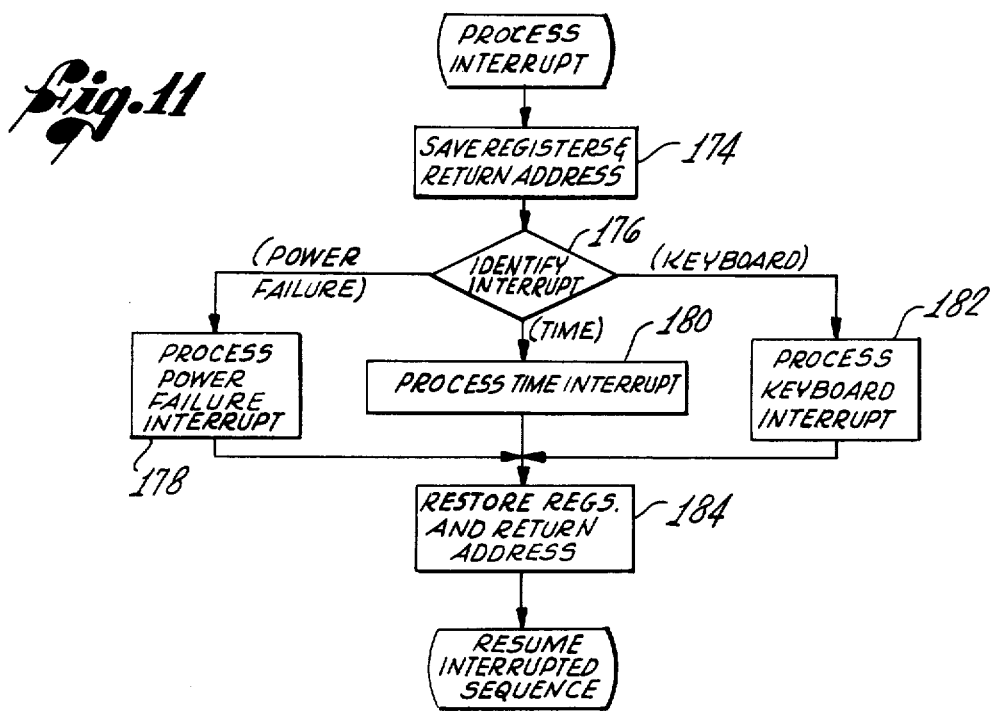

| BYTE NO. | CONTENTS | |
|---|---|---|
| 1 | SCHEDULE | SCHEDULE OVERHEAD |
| 2 | UNUSED | |
| 3 | MODE/STATUS | |
| 4 | CONTROL STATUS | |
| 5 | REPEATS | |
| 6 | REPEAT COUNTER | |
| 7 | WATER BGT.-LOW BITS | |
| 8 | WATER BGT.-HIGH BITS | |
| 9 | STEP COUNTER | |
| 10 | TIME/EVENT FLAG | |
| 11 | | |
| 12 | TIME/EVENT COUNTER | |
| 13 | | |
| 14 | CONTROL AND STEP STATEMENTS | SCHEDULE STATEMENTS |
| n | | |
| n+1 | 1 0 1 0 1 0 1 0 | DELIMITING CHARACTER |

*Fig. 15* SCHEDULE FORMAT

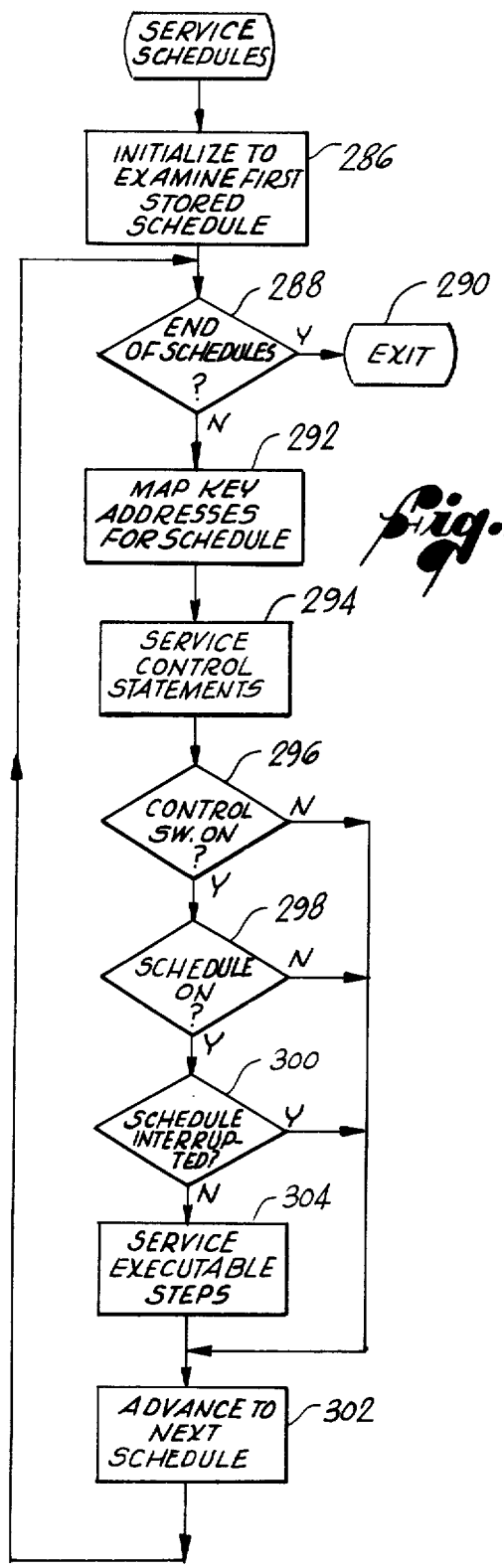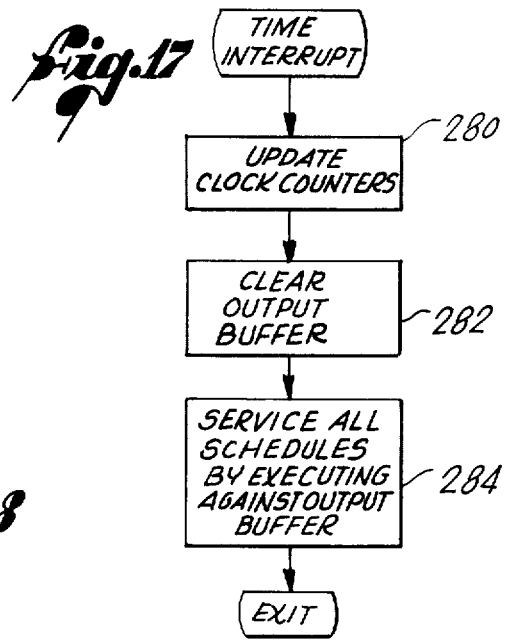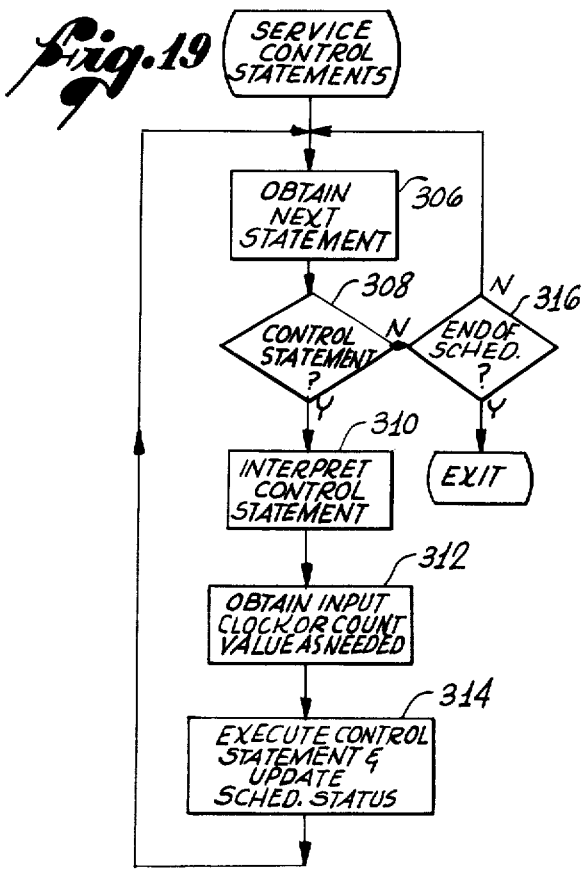

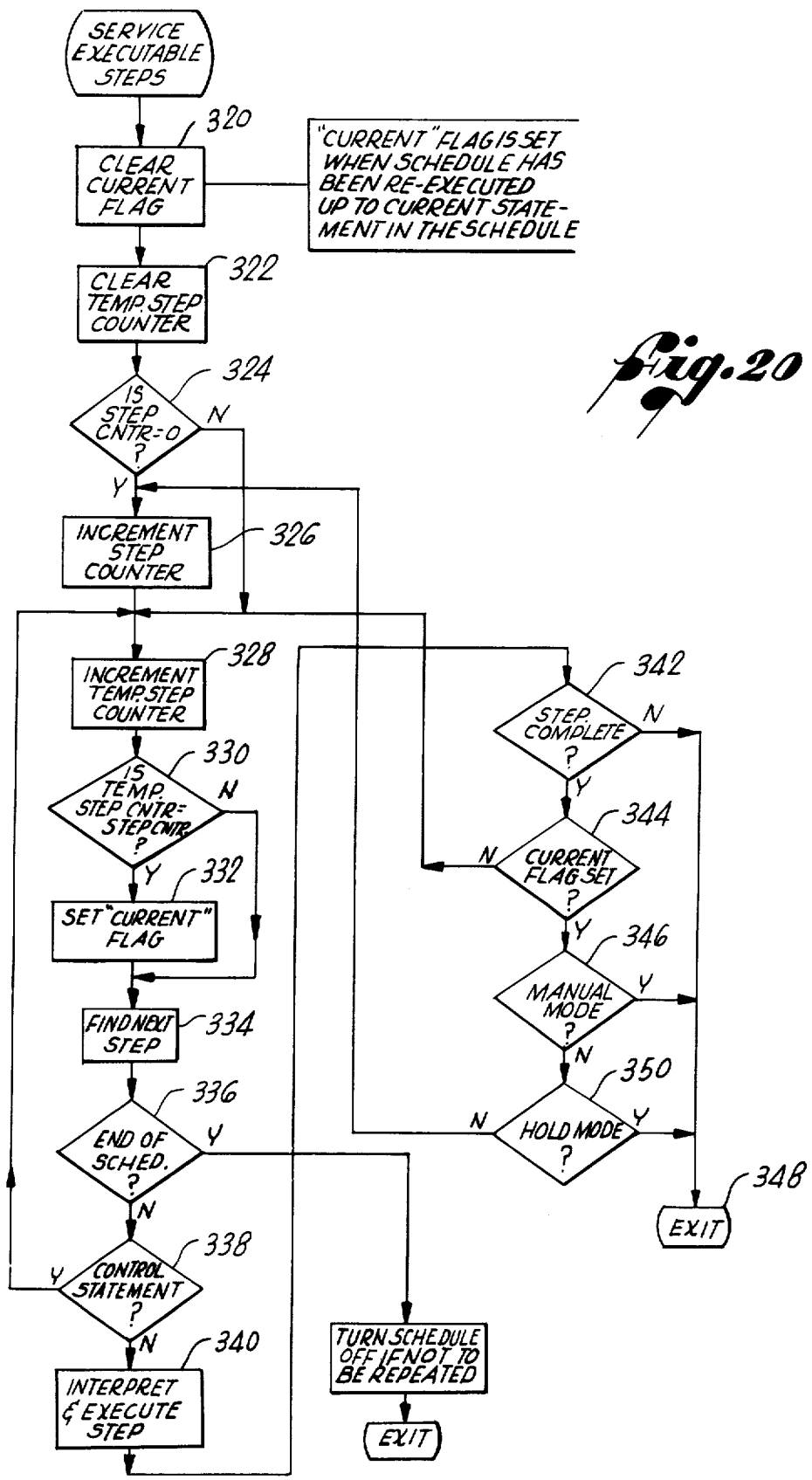

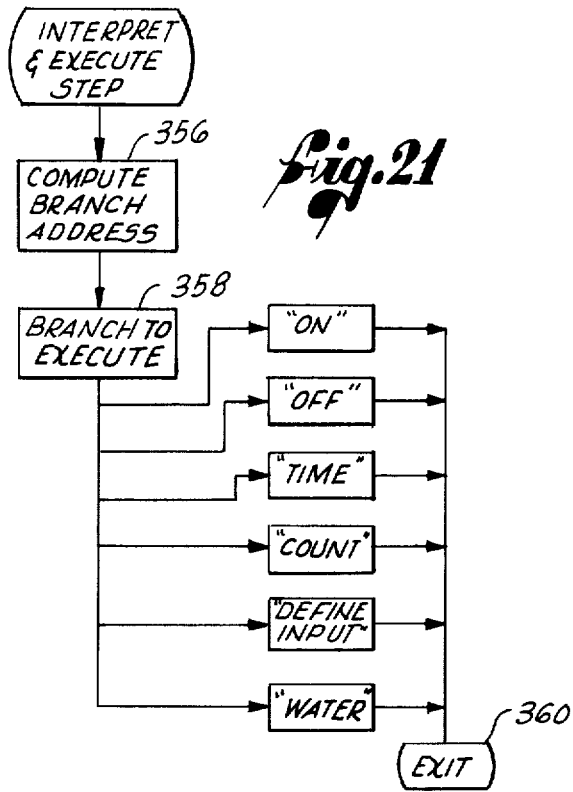
Fig. 21
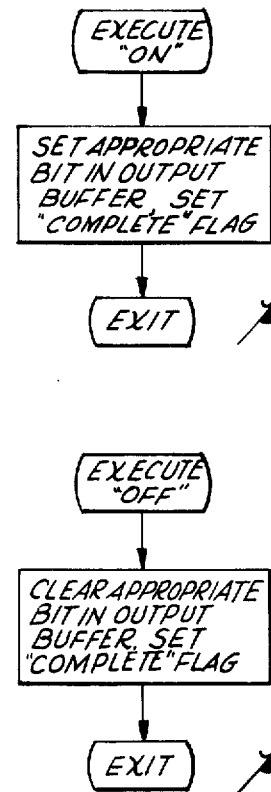
Fig. 22
Fig. 23
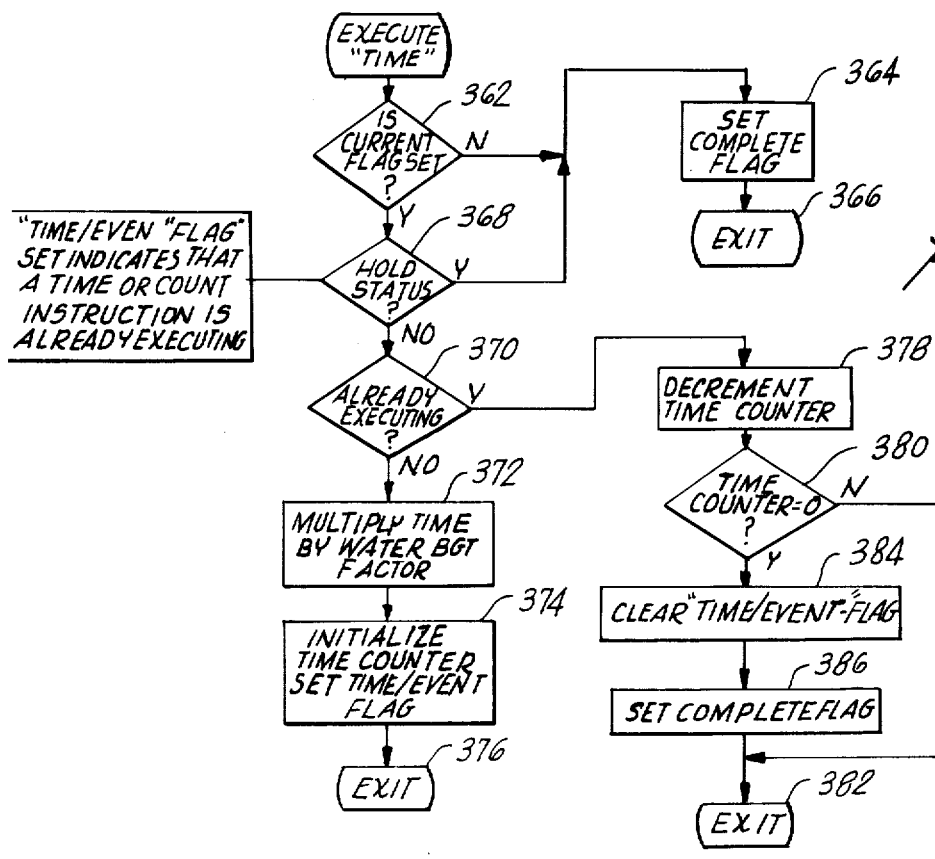
Fig. 24

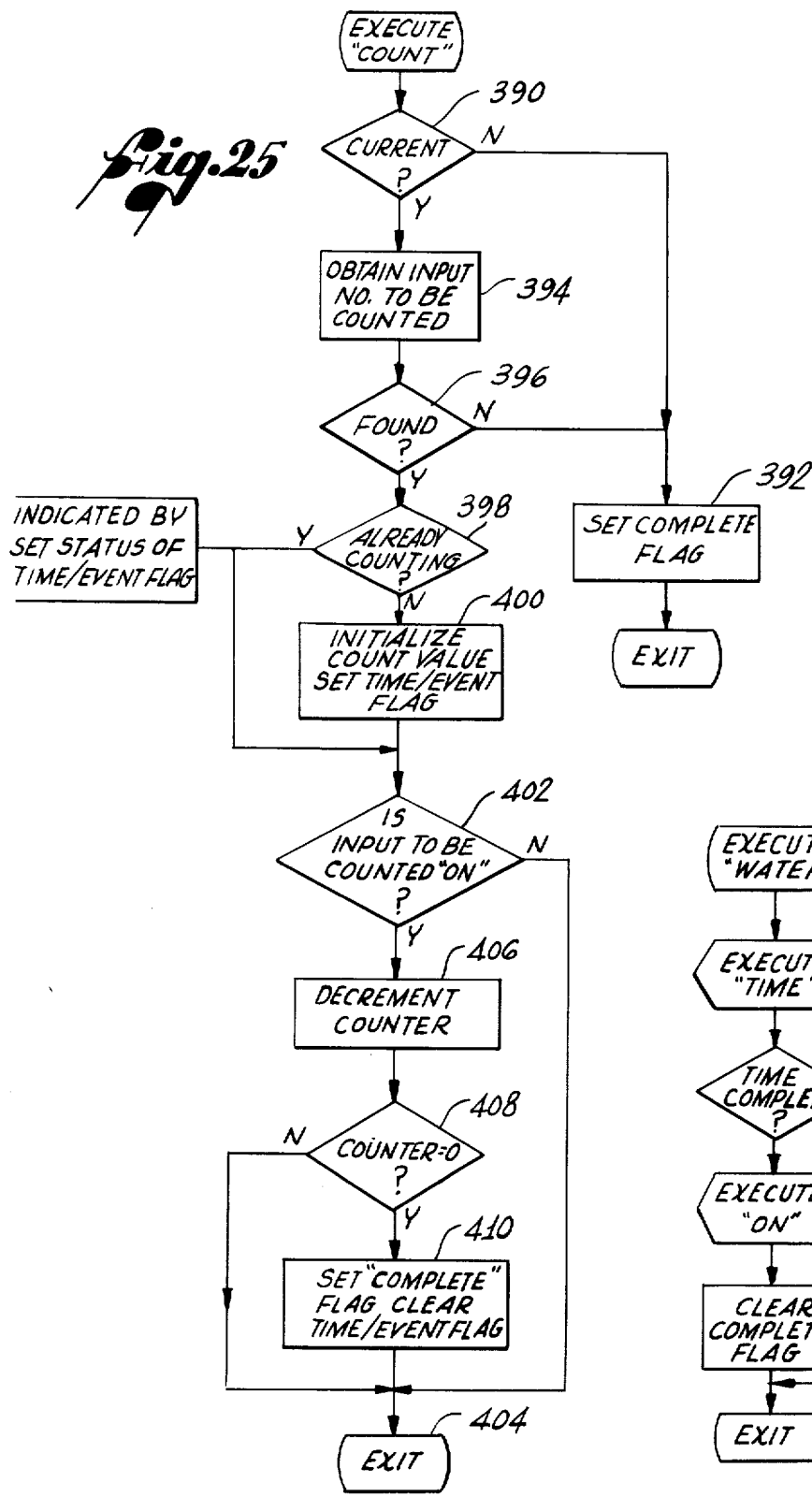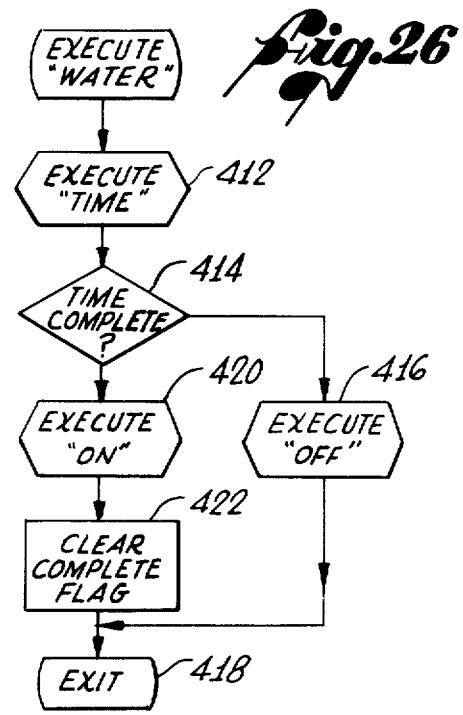

INTERACTIVE IRRIGATION CONTROL SYSTEM

BACKGROUND OF THE INVENTION

This invention relates generally to irrigation control systems, and, more particularly, to such systems used to control a relatively large number of irrigation or sprinkler valves in accordance with one or more desired schedules of operation.

Large irrigation systems, whether used to irrigate agricultural property, sports facilities, or other types of terrain, include a relatively large number of water valves, which are typically solenoid operated, and which must be opened and closed in a desired and controllable sequence of operations, as dictated by the terrain, weather conditions, crop or turf characteristics, and other factors. For many years, such large irrigation systems have been controlled by means of a central electromechanical controller which operates in a sequential fashion, i.e., one valve or group of valves is switched on for a preselected watering time, then the next group is switched on for another preselected watering time, and so on until the schedule of operations is completed. Typically, such electromechanical controllers include a timing motor and a plurality of switches for selecting the watering times. Such controllers are usually limited to only one or two different schedules of operations. Although this limitation imposes no significant hardship on some users of large irrigation systems, agricultural users in particular need a control system which can be conveniently modified or reprogrammed to accommodate crop changes as well as changes in climatic conditions. Changing the watering schedules of electromechanical controllers is not only time consuming, but also can result in unnecessary waste of water, before the need for a change becomes apparent, and as the new schedule is being brought into use. Moreover, when the old schedule is needed again it has to be regenerated.

Ideally, a large irrigation control system should be capable of executing several different schedules, concurrently if desired, and the user should be able to add, delete, or modify schedules without disturbing the operation of the system. Moreover, it should be possible to so modify the schedules using a "language" of control instructions which have significance to the irrigation user, and the instructions should not be limited to the sequential mode of operation of conventional electromechanical controllers. Furthermore, an ideal irrigation control system of this kind should be inherently reliable. Control systems of the prior art typically transmit control signals to switch valves on or off at the times when they are designated to be switched on or off. However, transmission of a control signal to switch a valve on or off provides no assurance that the valve has been actually switched in the desired manner, and will remain in the intended condition. Such prior art systems frequently fail to operate as intended when a valve does not respond to a control signal or fails to remain in its switched condition.

Accordingly, there has long been a need for an irrigation control system which fulfills the foregoing ideal requirements and overcomes the shortcomings of the prior art. The present invention is directed to this end.

SUMMARY OF THE INVENTION

The present invention resides in an interactive irrigation control system which is capable of controlling a large number of irrigation valves in accordance with one or more schedules of instructions provided by the user. Interaction between the system and the user is effected by means of an input device and an output device, and the instruction format is highly user-oriented. For example, the user can utilize an instruction to water at a particular valve station for a selected time. The schedules of instructions are supplied to the system through the input device, and schedules may be added, deleted, or modified without disrupting normal operation of the system. An important aspect of the invention is that the system may be connected to one or more sensing devices for the measurement of such conditions as soil moisture content, temperature, humidity, or water flow, and the system may then be programmed, in a schedule of instructions, to take a desired action upon the sensing of selected conditions in the field. For example, watering at particular valves, or over an entire schedule of operations, can be conditioned upon the sensing of a selected minimum soil moisture content.

Briefly, and in general terms, the apparatus of the invention in its broadest sense comprises means for controlling a plurality of irrigation valves in accordance with one or more schedules of irrigation-oriented instructions, which schedules may be executed concurrently, and means for modifying the schedules of instructions without disturbing operation of the system. In accordance with an important aspect of the invention, the control system is also responsive to input signals derived from sensing devices located in the field, and a schedule may include instructions which place the schedule in a selected status, such as on or off, based upon the detection of a selected sensed condition. In this manner, automatic selection can be made from multiple schedules, each of which is designed to provide optimum irrigation of a particular area for a particular climatic or soil condition.

More specifically, the apparatus of the invention comprises digital output means through which valve control signals are transmitted, digital input means through which status signals representative of sensed field conditions are received, schedule storage means for storing at least one schedule of instructions, a clock for timing controlled operations of the valves, and schedule service means for generating output signals to control the valves in response to the schedules of instructions as they might be conditioned upon the status of selected input signals. The apparatus of the invention further includes user input and output means, and user input/output service means for interpreting user instructions and deriving therefrom schedules for storage in the schedule storage means, and for initiating output messages to the user through the user output means.

In terms of a novel method, the present invention basically includes the steps of controlling a plurality of irrigation valves in accordance with one or more independent and repeatable schedules of instructions, and modifying schedules of instructions using an irrigation-oriented language, concurrently with the step of controlling the valves. The method of the invention also encompasses receiving input signals indicative of sensed field conditions and modifying the controlling step in accordance with the states of selected input signals.

The method of the invention can also be defined to include the steps of storing a digital output image in an output buffer, continually refreshing or regenerating the image, and repeatedly outputting the image to provide appropriate switching of the valves and to maintain them reliably in their intended conditions. In more specific terms, the method of the invention includes the steps of storing at least one schedule of instructions in a schedule storage module, periodically interpreting each stored schedule of instructions and generating an output data image therefrom, repeatedly outputting the data image to switch a plurality of irrigation valves in accordance with the data image, receiving input data signals indicative of sensed field conditions, and modifying operation of the steps of interpreting the instructions and generating the output data image, in accordance with the states of selected input signals.

In the presently preferred embodiment of the invention, the schedule service means operates to store outputs in an output buffer and to receive inputs from an input buffer, and the digital input and digital output means include a digital input/output service means which functions independently of the schedule service means to transfer data out of and into the control system through the output and input buffers.

Operation of the schedule service means is initiated on a timed basis, for example every second, and each schedule is serviced from its first instruction to its current instruction, so that the contents of the output buffer are thereby continually refreshed or regenerated, to provide an extremely reliable output data image. The digital input/output service means operates cyclicly and on an essentially continuous basis, independently of the schedule service means, and outputs information from the output buffer as rapidly as possible, limited only by the transmission speed of the apparatus to which the control system is connected. In this manner, the output information is transmitted to the valves on a repetitive basis, to ensure that the valves are always reliably switched to their intended states.

The control system of the present invention is particularly well suited for use with a two-wire irrigation system of the type described in U.S. patent application Ser. No. 644,535 now U.S. Pat. No. 4,131,882 by Michael D. Hollabaugh et al, entitled DIGITAL TWO-WIRE IRRIGATION CONTROL SYSTEM WITH FEEDBACK, and assigned to the same assignee as the present application. As described in the aforementioned application, it is highly desirable that the number of conducting wires between a central control site and the remotely located valves be kept to a minimum, preferably two wires. In the system described and claimed in the application, both power and control signals are transmitted along a pair of wires from a central site to a plurality of addressable decoder modules connected to the wires, and feedback signals are transmitted from the decoder modules back to the central site, to confirm that the desired switching operation has been accomplished. The feedback signals can also be used to convey information from sensing devices rather than from valves, and the decoder modules may therefore be connected either to valves or to sensing devices.

Accordingly, the apparatus of the invention may also be considered to comprise the combination of interactive controller means for generating valve control signals in accordance with a schedule of irrigation-oriented instructions which may be conditioned as desired upon the states of designated input signals, encoding means for receiving the valve control signals from the controller means and transmitting them with power signals along a pair of conductors, and a plurality of decoder modules connected to the pair of conductors at remote locations and having means for decoding the control signals and controlling valves in accordance therewith. Further included are a plurality of sensing devices, each associated with a decoder module, and means in the decoder module for transmitting a feedback signal along the two conductors to the encoding means, and thereby transmitting signals indicative of the conditions of the sensing devices.

It will be appreciated from the foregoing that the present invention represents a substantial advance over irrigation controllers available heretofore. In particular, it provides an inherently reliable control system which is extremely versatile from a user standpoint, in that it may be programmed to manipulate many valves in accordance with a plurality of schedules of irrigation-oriented instructions, and its operation may be conditioned upon the states of selected sensing devices in the field. The practical advantages of the system include its reliability, versatility, and convenience, as well as its inherent ability to minimize wastage of water. Other aspects and advantages of the invention will become apparent form the following more detailed description, taken in conjunction with the accompanying drawings.

BRIEF DESCRIPTION OF THE DRAWINGS

FIGS. 8a–8g together constitute a timing diagram associated with operation of the two-wire system shown in FIGS. 4–7.

FIGS. 10–14 are functional flow charts describing operation of the control system of the invention;

FIG. 15 is a memory map showing the format of a schedule stored in the control system; and FIGS. 16–29 are further flow charts describing operation of the control system of the invention.

DESCRIPTION OF THE PREFERRED EMBODIMENT

1. Introduction

Figure 1:
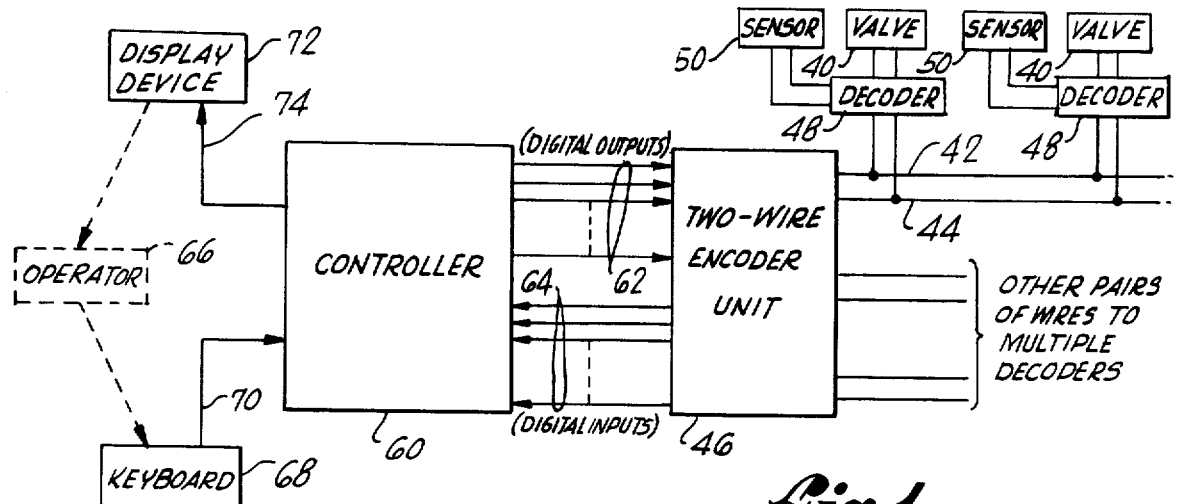
FIG. 1 is a simplified block diagram of an interactive irrigation control system constructed in accordance with the present invention and shown connected to a two-wire irrigation system.

As shown in the drawings for purposes of illustration, the present invention relates to an interactive irrigation control system having associated with it a large number of electrically actuated irrigation valves, which are to be manipulated in accordance with one or more schedules of instructions provided by a user of the system. As shown in FIG. 1, the valves, indicated by reference numeral 40, may be controlled by signals derived from a common pair of conductors 42 and 44 emanating from a two-wire encoder unit 46 located at a central site. A plurality of decoders 48 are connected to the wires 42 and 44 at desired remote locations, and operate to provide power to the valves 40 and to decode control signals transmitted along the conductors by the encoder unit 46. Such a two-wire system is described in detail in U.S. patent application Ser. No. 644,535 by Michael D. Hollabaugh et al, entitled DIGITAL TWO-WIRE IRRIGATION CONTROL SYSTEM WITH FEEDBACK and assigned to the same assignee as the present application. The two-wire system may also include a plurality of sensors 50 also connected to the decoders 48 at the remote locations. Each sensor 50 can be used either to sense that the valve has been appropriately switched on or off, or can be connected to a decoder which has no valves at all associated with it. The decoder and sensor then together form a sensing device of which the status can be interrogated from the two-wire encoder unit 46.

As also shown in FIG. 1, the system of the invention includes a controller 60 which provides a plurality of digital outputs on lines 62 to the encoder unit 46, and receives a plurality of digital inputs on lines 64 from the encoder unit. It will be appreciated as this description proceeds that the controller 60 may also be used in conjunction with other irrigation systems, which are not of the two-wire type, but the invention is described here, for purposes of explanation, in conjunction with the presently preferred two-wire system. The controller 60 is an interactive one, i.e., its operation can be modified by interaction with an operator, indicated at 66. The operator can input data to the controller through a keyboard 68 which is connected to the controller by line 70, and can receive output information from the controller by means of a display device 72 connected to the controller by line 74.

In accordance with an important aspect of the invention, the controller 60 may be conveniently programmed through the keyboard 68, used in conjunction with the display device 72 and utilizing schedules of instructions framed in an irrigation-oriented language which is easily learned and understood by the operator 66. Schedules of instructions may be added, deleted, or modified while other schedules are still being executed by the controller 60, undisturbed by the programming process. Moreover, the execution of schedules of instructions can be conditioned upon the sensing of specified input conditions derived from the sensors 50 at the remote locations. For example, initiation or termination of a schedule can be conditioned upon the sensing of a predetermined soil moisture level.

Figure 3:
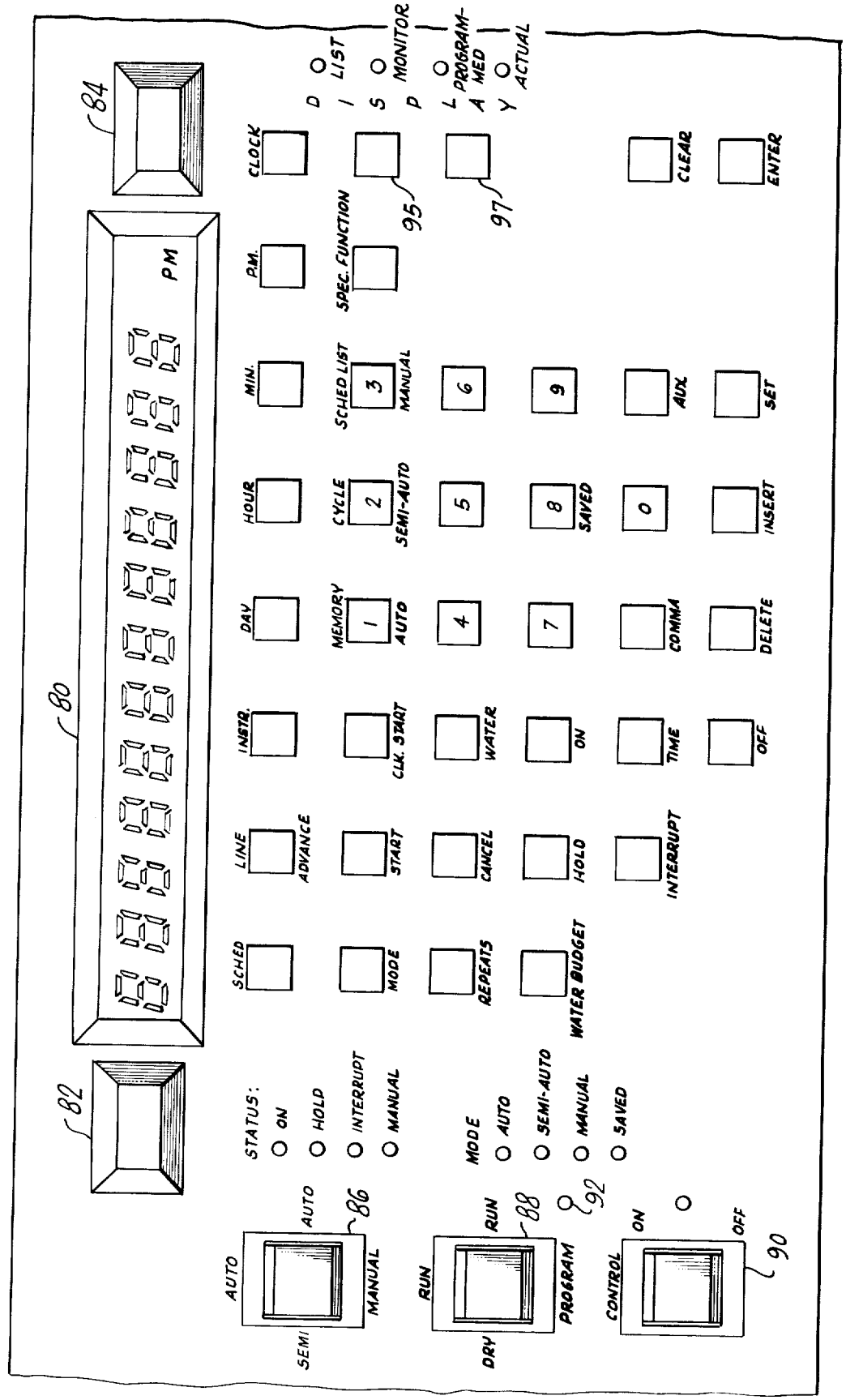
FIG. 3 is a front view of a control panel which includes the functions of the keyboard and display device of FIG. 1.

The controller 60, which will be defined in detail herein, may be implemented in any of a variety of forms, but it is presently preferred to employ a microprocessor programmed to perform the required functions. Alternatively, the controller 60 can be completely hard-wired to perform the same functions. Preferably, the display device 72 and keyboard 68 are integrated into a single control panel, as illustrated in FIG. 3. For purposes of explanation of the invention, the various functions of the control panel will first be described from an operator standpoint, before turning to a detailed description of the controller 60, and the effect of the various keyboard controls.

2. Control Panel Functions

For the most part, the control panel illustrated in FIG. 3 can be described without use of reference numerals, since the designations on the keys, switches and indicator lights are themselves adequately descriptive. The display device 72 (FIG. 1) comprises a twelve-digit numerical diplay 80 located at the top of the panel and, on each side of the twelve digit display, two back-lighted projection screens 82 and 84 used for projecting various error messages and other advisory messages to the operator. The display also includes a number of single indicator lights, which are preferably light-emitting diodes, the purpose of which will be explained as the description proceeds.

The keyboard includes two system mode switches 86, 88, an on/off control switch 90 and forty push-button keys. The system mode switches 86 and 88 are not schedule-specific, i.e, they select operating modes which apply to all of the schedules that may be presently stored in the system. The first system mode switch 86 has three positions; automatic (AUTO), semiautomatic (SEMIAUTO) and MANUAL. In the automatic mode, each programmed schedule proceeds under its own control, if it has been activated or turned on. In the semi-automatic system mode, a schedule has to be started manually, but will then proceed in accordance with the schedule instructions. In the manual mode, each schedule must be both started manually and advanced from step to step manually. Each schedule of instructions or steps will also have its own schedule-specific mode, either automatic, semiautomatic or manual, which applies to that schedule only. The actual operating mode for a given schedule will be the lower level of automation of the system mode and the schedule-specific mode. For example, if the schedule-specific mode is automatic but the system mode as selected on the switch 86 is manual or semiautomatic, then the system mode switch overrides the schedule-specific mode. On the other hand, if the system mode is selected as automatic, but the schedule-specific mode is manual or semiautomatic, then the schedule-specific mode overrides the system mode selected.

The other system mode switch 88 also has three positions, designated RUN, DRY RUN, and PROGRAM. In the RUN mode, the schedules run as intended, i.e., the outputs of the controller 60 (FIG. 1) are connected to a system such as the two-wire system shown in FIG. 1, and thence to valves in the field. In the DRY RUN mode, the controller 60 operates exactly as in the RUN mode, but the controller outputs do not affect the conditions of valves in the field. Rather, a panel of lights on the two-wire encoder unit 46 is operated to simulate the conditions of the valves if they had been switched in accordance with the schedules running in the controller. In the program mode, the controller 60 is conditioned to be responsive to keyboard inputs which permit the creation of new schedules, and the deletion or modification of existing ones. An indicator light 92 is provided to confirm that the controller is in the program mode.

The on/off control switch 90 allows the operator to deactivate the controller 60 without destroying any of the schedules stored in it. If the control switch 90 is placed in the off position, no schedules will run and no digital outputs will be initiated.

Also on the control panel are four status indicator lights which are used to indicate the status of a particular schedule selected by the operator. The status lights are labeled ON, HOLD, INTERRUPT, and MANUAL. The ON status light indicates that the selected schedule has been activated or turned on, the HOLD status light indicates that the schedule is in a "hold" status, which means that it has ceased executing consecutive steps in the schedule and its output conditions are frozen in the state in which they were at the time the "hold" status was placed in effect. The INTERRUPT light indicates that the schedule is in an "interrupt" status, which is similar to the "hold" status except that all outputs associated with the schedule are turned off. The MANUAL status indicator light indicates that the "hold" or "interrupt" status was initiated manually through the control panel, as contrasted with the same status being reached automatically as a result of sensing a particular input condition.

Also on the control panel are four mode lights designated AUTO, SEMI-AUTO, MANUAL, and SAVED. The mode lights indicate the mode of a selected schedule, and this is the programmed or schedule-specific mode referred to earlier, and not the system mode determined by the positions of the system mode switch 86. The meanings of the AUTO, SEMI-AUTO, and MANUAL lights have already been discussed. The SAVED mode light indicates that the schedule is to be saved for future use by the controller 60, rather than erased or destroyed after one execution pass.

If it is assumed for a moment that one or more schedules of instructions have already been stored in the controller 60, the keyboard functions that can be performed to affect operation of the schedules can be described. The push button keys on the keyboard include numerical keys 1 through 9 and 0, and also include a schedule selection key, designated SCHED. The first action of the operator is usually to select a schedule on which some subsequent operation is to be performed. This is done by actuating the SCHED key followed by a single-digit or two-digit schedule number in the range 1-99, and concluding the sequence by actuating the ENTER key on the keyboard.

The ENTER key is used to terminate input sequences on the keyboard, and allows the controller to recognize the end of an input sequence and take the requested action. There is also a CLEAR key which allows the operator to clear the keyboard in much the same manner as a clear key on a conventional electronic calculator.

When a particular schedule has been requested or called up, the first instruction or step of the schedule will be shown in the display 80. There is a spatial relationship between the fields of the display 80 and the designations on the keys immediately below the digital display. For example, the SCHED key is positioned immediately below the first two-digit field of the display, and the schedule number will appear in that field. Similarly, the line or step number within the schedule will appear in the second two-digit field of the display, immediately above a LINE or LINE ADVANCE key. Situated below the third two-digit field of the display 80 is an instruction key, designated INSTR, and this display field will be used to show a two-digit instruction code associated with the particular step or line being displayed. There are three further two-digit fields of the display 80, and these are located immediately above a DAY key, an HOUR key and a MINUTE key (MIN), respectively. These three fields are used to display the parameters or arguments of a given instruction which, in some cases, happen to be day, hour and minute parameters.

If a particular schedule has been requested, by actuating the SCHED. key, the schedule number and the ENTER key, the schedule number will appear in the first display field, "01" will be displayed in the second display field, and the first line or instruction will be displayed in the balance of the digital display 80. Also, the program status and mode lights previously discussed will indicate the current status and mode of the schedule. If the LINE ADVANCE key is actuated once, the second line or instruction will then be displayed, and successive lines can be displayed by depressing the LINE ADVANCE key an appropriate number of times. A particular line can be displayed by actuating the LINE key, entering the line number and actuating the ENTER key. These actions utilize what will be referred to as the "list" mode, wherein a schedule can be examined or listed, regardless of whether the schedule is currently on or executing. A LIST key is provided to allow the operator to take the controller out of list mode and into what will be referred to as "monitor" mode. The LIST key, indicated at 95, operates in toggle fashion, so that actuating it once when in the list mode places the controller in the monitor mode, and actuating it again places it back in the list mode.

In the monitor mode, which is only of significance when the schedule is currently in an on condition, the step currently being executed in the selected schedule will be displayed. For example, if the step currently being executed happens to be an instruction to WATER at Station #25 for 30 minutes, then what would appear in the display would be the schedule number, the line or instruction number within the schedule, the instruction code for a WATER instruction, and the minute parameter of the WATER instruction.

The parameter of the instruction that was displayed could be either the programmed value, 30 minutes in this example, or the actual time remaining in the instruction, depending upon the toggle setting of a key 97 designated herein as the PROGRAMMED/ACTUAL key. Display indicator lights associated with the switch indicate which is the current status of this particular toggle key. As will shortly be explained, it is possible to change the real-time or actual value remaining in the instruction without affecting the programmed value, which will be used on the next occasion that the instruction is executed.

Once a schedule has been requested by entering a schedule number as described, there are a number of other operations which may be performed on the schedule without placing the controller in the program mode. These functions are initiated by means of the following push button keys: MODE, REPEATS, WATER BUDGET, START, CANCEL, HOLD, and INTERRUPT, and will now be described in detail.

The MODE key allows the operator to change the mode of an existing program. The keying sequence for this function is to first actuate the MODE key and then to actuate one of the numeric keys 1, 2, or 3, which serve the dual functions, as designated, of AUTOMATIC, SEMIAUTOMATIC and MANUAL mode keys. The keying sequence would be completed, as usual, by actuating the ENTER key. For example, if the mode lights indicated that the schedule was in automatic mode, it could be placed in manual mode by actuating the MODE key, the MANUAL key (numeral 3), and the ENTER key. The mode lights should then indicate a change from automatic to manual status.

The MODE key can also be used in conjunction with the numeral 8 key, which has the dual function, as designated, of changing SAVED status of schedule. When a schedule is to be saved, it will be available for subsequent execution. If a schedule is designated as "not saved", it will be executed once, repeated if programmed to be repeated, then purged from the system. Operation of the MODE, SAVED and ENTER keys in that sequence has the effect of toggling the saved/not-saved status of the schedule, and the new status will be immediately reflected in the condition of the SAVED status light. Unlike the other mode changes effected by use of the MODE key, changing the saved/not-saved status can only be accomplished when the system is in program mode.

The REPEATS key is used to examine or modify a schedule parameter used to indicate the number of times that the schedule is to be repeated automatically each time it is initiated. To display the number of repeats, the operator actuates the REPEATS key followed by the ENTER key. To modify the number of repeats the operator actuates the REPEATS key, enters the new number of repeats, and terminates the sequence, as usual, with the ENTER key.

The WATER BUDGET key relates to another parameter associated with each schedule, namely the water budgeting factor. It is sometimes desirable to reduce the overall level of irrigation provided by a given schedule by a given percentage. For example, the user of the system might wish to reduce his water consumption by ten percent, but still maintain the same schedules of operation. Entering a water budgeting factor of ninety percent would have the desired effect of reducing all watering times contained within a schedule to ninety percent of their programmed values. Obviously, a water budgeting factor of one hundred percent would be the normal setting of this parameter. The water budgeting factor is displayed by actuating the WATER BUDGET key followed by the ENTER key, and may be modified by actuating the WATER BUDGET key, entering the new percentage factor, and terminating the sequence with the ENTER key.

The START key allows the operator to manually start the schedule which has previously been called. The CANCEL, HOLD, and INTERRUPT keys similarly allow the operator to cancel or stop a schedule which is presently executing, or to place it in the hold or the interrupt status. All four of these keys are "single-stroke" keys requiring no actuation of the ENTER key to terminate the sequence. The HOLD and INTERRUPT keys are toggle-like in operation. A schedule may be restarted from a "hold" status by actuating the HOLD key again.

Also provided on the keyboard is a special function key (SPEC. FUNCTION), which allows various other functions to be performed, also without being in the program mode. Following actuation of the SPEC. FUNCTION key, the operator must depress one of the numeral keys 1, 2 or 3 which serve yet another function, as indicated by the designations MEMORY for key 1, CYCLE for key 2 and SCHED. LIST for key 3. Actuating the SPEC. FUNCTION key and the MEMORY key, followed by ENTER, gives the operator an indication of how much memory remains in the controller for storage of new schedules. Operation of the SPEC. FUNCTION key followed by the CYCLE key and ENTER, displays the number of days in the timing cycle utilized by all the schedules in the system. The number of days can be altered by then actuating the SET key, followed by the new cycle time days, and the ENTER key. Actuating the SPEC. FUNCTION key, followed by the SCHED LIST key and the ENTER key, provides a display of all of the schedules stored in the system. They are displayed sequentially for a few seconds each so that the status of each may be examined and appropriate action taken as desired.

Finally, there is a single-stroke CLOCK key, the actuation of which provides a display of the time of day. The time of day may be altered by then actuating the SET key, the DAY key and the number of the day, the HOUR key and the hour parameter, and the MIN key and the minute parameter, followed by the optional PM key and the ENTER key.

The only keys not already described are those utilized in the program mode. In particular there is the instruction key INSTR, already mentioned, the clock start key (CLK. START), the WATER key, the ON key, the TIME key, the OFF key, the COMMA key, the DELETE key, the INSERT key and the SET key. In storing a new schedule of instructions, the operator first places the system in program mode by switching the system mode switch 88 to the PROGRAM position. Then he selects an unused schedule number, and this will result in display of the schedule number, a "1" in the line field of the display, and blanks in the remaining display fields. The operator must then enter the instruction code, followed by the parameters of the instruction, and the ENTER key. The instruction may be entered by actuating the INSTR key followed by a numerical instruction code, or by actuating one of the five specific instruction keys, namely CLK. START, WATER, ON, TIME, or OFF. The effect of these five keys will first be discussed in detail, since these are the instructions most commonly used in generating a schedule.

As indicated in Table I which contains an instruction summary, the clock-start (CLK. START) instruction has three possible keying sequences. In the first, actuation of the CLK. START key is followed by entry of a day parameter following the DAY key, an hour parameter, following the HOUR key, and a minute parameter, following the MINUTE key. The result of this keying sequence is that the schedule will be started automatically on the day, hour and minute specified in the instruction parameters. In the second variation of the CLK. START instruction, only hour and minute parameters are entered, and the schedule will then start evey day on the hour and minute designated by the parameters. Similarly, in the third variation of the CLK. START instruction, in which only a minute parameter is entered, the schedule will be started automatically every hour, on the minute designated. The CLK. START instruction is an example of what will be referred to as a control instruction, as contrasted with a "step" instruction, which is executed sequentially in the schedule. A control instruction is one which applies to the schedule as a whole, rather than to sequential steps in the schedule, such as the ON and OFF instructions which will now be discussed.

The only parameter for the ON and OFF instructions is the valve or station number to which the ON or OFF command is to be transmitted. The TIME instruction initiates a delay, and the parameters of the instruction are either days, hours and minutes, or hours and minutes, or minutes only.

The WATER instruction is a higher level instruction combining ON and OFF instructions with a TIME instruction. The parameters are a valve number and a time in either minutes or hours. The effect of the instruction is to switch and hold the designated valve on for the designated period of time in minutes or hours.

As indicated in the instruction summary in Table I, other instructions of the control statement type which are available to the operator include CYCLE START, which allows the operator to start a schedule on a cyclic basis. There are three options for the CYCLE START instruction format. If the parameters entered are DAY X, HOUR Y MIN. Z, the schedule will be started every X days when the hour and minute parameters are equal to those designated. If the parameters entered are HOUR X, and MIN. Y, the schedule will be started every X hours when the minute clock is equal to Y. Finally, if only the minute parameter is entered (MIN. X), the schedule will be started every X minutes.

Control instructions based upon the condition of sensed inputs include SENSOR START, SENSOR CANCEL, SENSOR ADVANCE, SENSOR HOLD, and SENSOR INTERRUPT. These instructions have the designated effect on the schedule in which they are placed when a designated input is switched to an "on" condition. The input may be indicative of water moisture conditions, temperature, humidity, or any desired physical parameter sensed in a remote location.

The remaining control instructions relate to logging or recording functions of the controller. The LOG TIME instruction keeps track of the total elapsed time that the schedule is in an "on" condition and is not interrupted. The LOG SCHEDULE COUNT instruction keeps track of the number of sensor counts, i.e., the number of times that a sensor is set to a particular state while the schedule is in an "on" status. The sensor in this case would be used to digitally record some parameter such as volumetric flow. The LOG UNCONDITIONAL COUNT instruction operates in similar fashion but keeps track of the total sensor counts unconditionally, i.e., without regard to whether the schedule is on or off.

The COUNT instruction is a step statement, not a control statement, and keeps track of the sensor counts of a designated sensor when the schedule is on and the step is being executed. The COUNT instruction is analogous to the TIME instruction. Whereas the TIME instruction injects a delay in the schedule while a designated time value is counted down, the COUNT instruction injects a delay until a designated quantity, suchn as volume, has been measured.

The REMOTE CONTROL instruction defines a schedule as being accessible by a portable operator unit which may be plugged into the two conducting wires 42 and 44 (FIG. 1) in the field. Further discussion of the remote control instruction will be deferred until the two-wire system has been described in detail.

It should be noted that the instruction set available to the operator is not permanently limited to the instructions listed in Table I, but may be conveniently expanded by defining new instruction codes, up to a total of sixty-four in the present system.

The SET key may be used, as already described, to set a new time-of-day value or a new cycle time. More importantly, it can be used to modify any real-time parameter of a schedule instruction. For example, if a currently executing TIME instruction is timing out a thirty-minute delay, and twenty minutes remain to be counted down, the operator can reduce the remaining time to ten minutes, for example, by keying in the sequence: SET MIN 10 ENTER. The programmed delay time of thirty minutes will remain stored in the schedule and will be used on the next occasion that the TIME instruction is executed.

The DELETE and INSERT keys allow the operator to delete or insert schedule statements from or in an existing schedule. The COMMA key is a delimiting key to separate two numerical arguments in an instruction.

TABLE I

| INSTRUCTION SUMMARY | | | |
|---|---|---|---|
| Instruction | Code | Key Sequence | Stored Format |
| CLOCK START | 01 | CLK. START DAY X HOUR Y MIN Z ENTER | C1ZZXXYY |
| CLOCK START | 01 | CLK. START HOUR X MIN Y ENTER | C0XXYY |
| CLOCK START | 01 | CLK. START MIN X ENTER | C0XX |
| LOG TIME | 02 | INSTR. 2 ENTER | C2BB000000 |
| LOG SCHED. COUNT | 03 | INSTR. 3 ENTER[2] | C3BB000000 |
| LOG UNCOND. COUNT | 04 | INSTR. 4 ENTER[1] | C4BB000000 |
| SENSOR START | 05 | INSTR. 5 ENTER[1] | C5 |
| SENSOR CANCEL | 06 | INSTR. 6 ENTER[1] | C6 |
| SENSOR ADVANCE | 07 | INSTR. 7 ENTER[1] | C7 |
| SENSOR HOLD | 08 | INSTR. 8 ENTER[1] | C8 |
| SENSOR INTERRUPT | 09 | INSTR. 9 ENTER[1] | C9 |
| CYCLE START | 10 | INSTR. 10 DAY X HOUR Y MIN Z ENTER | CAZZYYXXBBXX |
| CYCLE START | 10 | INSTR. 10 HOUR X MIN Y ENTER | CAYYXXBBXX |
| CYCLE START | 10 | INSTR. 10 MIN X ENTER | CAXXBBXX |
| REMOTE CONTROL | 11 | INSTR. 11, X ENTER | CBXX |
| ON | 32 | ON X ENTER | $E0XX(XX)^2$ |
| OFF | 33 | OFF X ENTER | $E1XX(XX)^2$ |
| TIME | 34 | TIME DAY X HOUR Y MIN Z ENTER | E2ZZYYXX |
| TIME | 34 | TIME HOUR X MIN Y ENTER | E2YYXX |
| TIME | 34 | TIME MIN X ENTER | E2XX |
| COUNT | 35 | INSTR. 35 ENTER[1] | E3BB000000 |
| DEFINE INPUT | 37 | INSTR. 37, X ENTER | $E5XX(XX)^2$ |
| WATER | 38 | WATER X MIN Y ENTER | $E6YY9AXX(XX)^2$ |
| WATER | 38 | WATER X HOUR Y ENTER | $E7YY9AXX(XX)^2$ |

Notes
[1]These instructions must be immediately preceded by a DEFINE INPUT instruction.
[2]Parentheses indicate a variable length argument.

3. Controller Hardware

Figure 9:
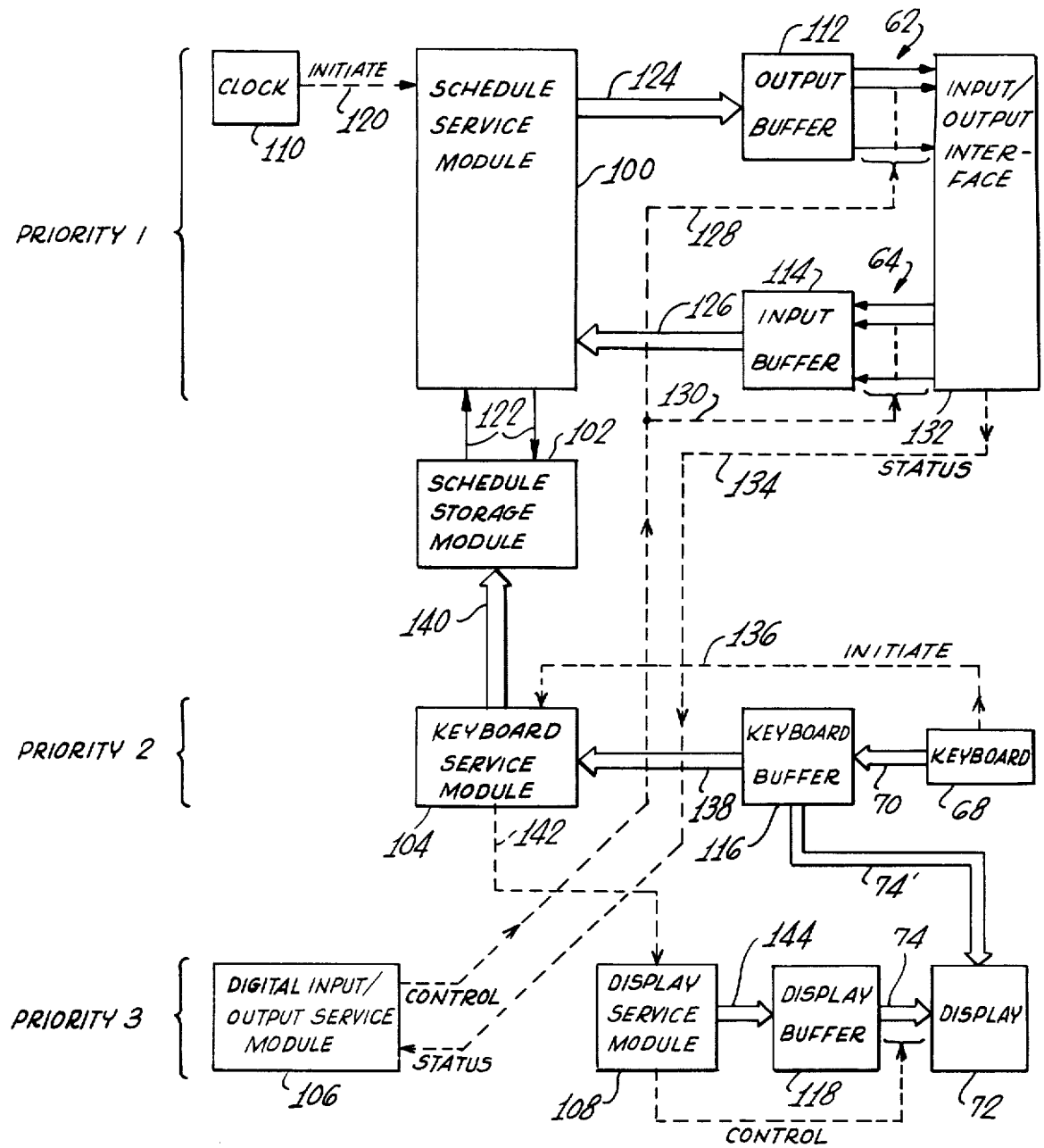
FIG. 9 is a simplified block diagram of the interactive irrigation control system of FIG. 1.

As already mentioned, the controller 60 (FIG. 1) can be implemented in completely hard-wired form. However, it is far more convenient from an engineering standpoint to implement the controller functions by means of a microprocessor, which can be more readily modified when minor improvements and changes need to be made to the system. Whether the controller is implemented in hard-wired or programmed microprocessor form, basically the same hardware functions are involved, and these are illustrated in FIG. 9.

The controller 60 has a schedule service module 100, a schedule storage module 102, a keyboard service module 104, a digital input and output service module 106 and a display service module 108. In addition, the controller has an internal clock 110, a digital output buffer 112, a digital input buffer 114, a keyboard buffer 116 and a display buffer 118. The schedule service module 100 is activated periodically, for example, every second, by the clock 110, as indicated by the broken line 120. The schedule service module 100 communicates with the schedule storage module 102, as shown by lines 122, and generates output signals which are transferred to the output buffer 112 over line 124. The schedule service module 100 also retrieves input signals stored in the input buffer 114, from which it receives the signals over line 126, as will be subsequently described in more detail.

The schedule service module 100 executes each schedule which is in the "on" condition from its first instruction to its current instruction, thereby ensuring that the contents of the output buffer 112 is refreshed every second, and always contains an accurate representation of the intended output signals.

The actual input and output operations are controlled by the digital input/output service module 106, as indicated by the broken control lines 128 and 130. Output data is transferred from the output buffer 112 to an input/output interface 132, the nature of which will depend upon the particular system with which the controller 60 (FIG. 1) is to be connected. The interface 132 may be thought of as part of the two-wire encoder unit 46 (FIG. 1). The interface 132 also provides status signals over line 134 back to the digital input/output service module 106. The digital input/output service module 106 operates asynchronously with respect to the schedule service module 100, and performs the digital input and output operations as rapidly as possible, limited only by the speed of the apparatus with which it is communicating. In any event, the digital input/output service module 106 performs the output and input operations on a cyclic and essentially continuous basis.

Actuation of keys on the keyboard 68 has the effect of initiating operation of the keyboard service module 104, as shown by the broken control line 136, and also has the effect of storing a coded character relating to the key which has been actuated, in the keyboard buffer 116. The keyboard service module 104 retrieves data from the keyboard buffer 116, as shown by line 138, processes the input data, and takes appropriate action. The action may be to modify the parameters of a schedule in the schedule storage module 102, as indicated by the line 140. Operation of the keyboard service module 104 may also involve communicating with the display service module 108, as shown by line 142, to initiate the display of requested information, or the display of error or other operator-related messages.

Finally, the display service module 108 transfers data to the display buffer 118 over line 144, and the data is transferred from there over line 74 to the display 72. When the keyboard 68 is being used to enter a keying sequence of commands, it is convenient to transfer that sequence directly from the keyboard buffer 116 to the display 72, as shown by line 74'. In this manner, the operator is able to view a keying sequence as it progresses.

It will be noted from FIG. 9 that the schedule service module 100, keyboard service module 104, digital input/output service module 106 and display service module 108 are arranged in three priority levels. The schedule service module 100 has the highest priority, i.e., the schedules are serviced every second, and any activities of the keyboard service module 104, digital input/output service module 106 and display service module 108 are temporarily suspended while the schedule service module is in operation. In similar fashion, the keyboard service module 104 has the second priority, i.e., any required operations of the digital input/output service module 106 or the display service module 108 are temporarily suspended when the keyboard service module is in operation. If the controller is implemented in microprocessor form, these priorities may be conveniently implemented as hardware interrupt levels. The microprocessor is serial in nature, i.e., it can perform only one function at a time. Therefore, it can be arranged that the microprocessor is performing functions of the digital input/output service module 106 and the display service module 108 as a background activity, but that it will be interrupted from this activity either by actuation of any of the keyboard keys, which causes activation of the keyboard service module 104, or by the occurrence of a clock interrupt, which activates the schedule service module 100. By the same token, the keyboard service module 104 can itself be interrupted by a clock interrupt when it is time for the schedule service module 100 to be activated.

The actual hardware employed in the controller 60 (FIG. 1) presently includes an Intel Model 8080 microprocessor or any other manufacturer's equivalent. It will be appreciated, however, that any similar microprocessor circuitry could be employed and conveniently programmed in accordance with the detailed description and flow charts provided herein.

Figure 2:
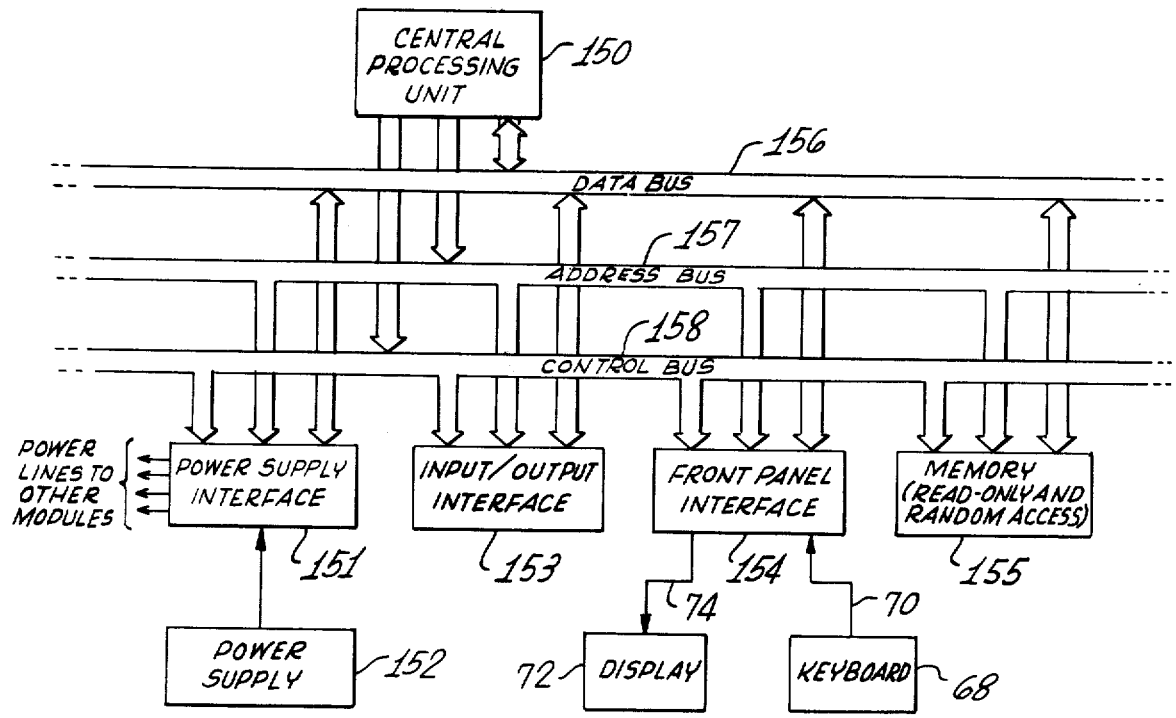
FIG. 2 is a simplified block diagram of a microprocessor by means of which the functions of the controller in FIG. 1 are preferably implemented.

FIG. 2 illustrates in simplified form the hardware organization of the controller 60 as it is presently implemented using a microprocessor. The controller includes a central processing unit 150, a power supply interface 151, a power supply 152, an input/output interface 153, a front panel interface 154, a memory module 155, a data bus 156, an address bus 157 and a control bus 158. The central processing unit 150 can transmit data to and receive data from the data bus 156, can transmit addresses to the address bus 157 and can transfer control signals to the control bus 158. The power supply interface 151, the input/output interface 153, the front panel interface panel 154 and the memory module 155 can each transmit data to, and receive data from, the data bus 156, can receive addresses from the address bus 157, and can receive control signals from the control bus 158. The front panel interface 154 is connected to the display 72 by line 74 and to the keyboard 68 by line 70.

It will be apparent that FIG. 2 illustrates the conventional organization of a typical microprocessor or microcomputer. The central processing unit 150 can retrieve programs of instructions from the memory 155 and can process them in generally sequential fashion, branching from its normal sequence when called upon to do so by the program, and being interrupted from its normal sequence by designated hardware-related events, such as clock-generated interrupts or keyboard-generated interrupts.

4. Controller Functions in Detail

FIGS. 10 and 11 together illustrate the functions performed by the controller 60 (FIG. 1). When the controller is first switched on, certain initialization functions have to be performed, as indicated by block 160. If the system is being powered up from an earlier power failure, these functions include setting various registers in the central processing unit 150 to ensure that operation will resume at the point from which it was interrupted by the power failure. Then, the system performs the remaining functions indicated in FIG. 10 in cyclic fashion until interrupted by any of the three basic hardware interrupts described in relation to FIG. 11. In block 162 some normally redundant reinitialization functions are performed. As will become apparent, if the functions illustrated in FIG. 10 are being performed, there are no unprocessed interrupts in existence. The reinitialization functions performed in block 162 therefore include resetting an interrupt pointer to reflect the fact that there are presently no unprocessed interrupts.

Next, in block 164, the system mode switches 86, 88 and 90 (FIG. 3) on the front panel are sensed, and the current conditions of these switches are stored internally. Then, the question is asked in block 166 whether the keyboard is currently being used. As will be seen, when the keyboard is being used an internal flag is set to yield an afirmative answer to the question posed in block 166. The effect of this is that display data will be derived directly from the keyboard buffer 116 (FIG. 9), as indicated in block 168 in FIG. 10. If the keyboard is not being used, the display is serviced, as indicated in block 170. Block 170 is performing the functions of the display service module 108 (FIG. 9), i.e., it is generating and storing display messages in the display buffer 118 (FIG. 9), in accordance with a particular mode of operation, and outputting the display data from the display buffer to the display 72. Finally, in block 172, the digital outputs and inputs are serviced, this being essentially the function of the digital input/output service module 106 (FIG. 8). After the digital inputs and outputs have been serviced in block 172 return is made to the reinitialization block 162, and the loop including blocks 162, 164, 166, 168 or 170, and 172 is performed continuously until an interrupt is received, at which time control is transferred to the processing routine illustrated in FIG. 11.

On the occurrence of such an interrupt, certain registers of the central processing unit 150 (FIG. 2) are saved, as shown in block 174. A return address is also saved, whereby, after the interrupt has been completely processed, return may be made to the appropriate point in the processing loop of FIG. 10. After the registers and return address have been saved, the source of the interrupt is identified, as shown in block 176, and control is transferred either to process a power failure interrupt, as shown in block 178, or to process a time interrupt as shown in block 180, or to process a keyboard interrupt as shown in block 182. When the appropriate interrupt has been processed, the central processing unit registers and return address are restored, as indicated in block 184, and control is transferred back to the point of interruption.

As discussed in relation to FIG. 9, servicing the display and the digital inputs and outputs has the lowest priority, servicing the keyboard has the next highest priority, and servicing the time interrupt has the next highest priority. Accordingly, the processing loop of FIG. 10 can be interrupted by either a keyboard interrupt or a time interrupt, and the processing of a keyboard interrupt can itself be interrupted by a time interrupt. The power failure interrupt has the highest priority of all, and can interrupt processing of the FIG. 10 servicing loop or of the keyboard or time interrupt servicing routines.

The power failure interrupt is generated as a result of sensing a missing or degraded power signal. The interrupt is processed by setting an internal flag to indicate that a power failure interrupt has occurred, switching to a battery power supply, activating a memory protection feature to prevent erasure of the contents of the system memory module 155 (FIG. 2), and then waiting for a predetermined delay time until the power failure is complete. If it transpires that the detected power failure was merely a result of a transient condition on the power line, at the end of the delay time control can be transferred to block 184, to restore the registers and resume the interrupted sequence. If, on the other hand, the power failure was real, the flag set during the power failure interrupt routine in block 178 can be detected during later start-up, and operation of the system can be resumed at the point where processing was taking place when the power failure interrupt occurred.

Processing the time interrupt in block 180 will shortly be explained in greater detail. Basically, it involves activating the schedule service module 100 (FIG. 9) to service all of the active schedules and to refresh the contents of the output buffer 112 (FIG. 9), so that it accurately reflects the intended status of irrigation valves in the field.

Processing of the keyboard interrupt in block 182 basically involves activation of the keyboard service module 104 (FIG. 9). A keyboard interrupt is generated when any of the keys of the keyboard is actuated, except the system mode switches 86, 88 and the control on/off switch 90. It will be recalled that these switches are read or sensed during the main program loop shown in FIG. 10.

Figure 12:
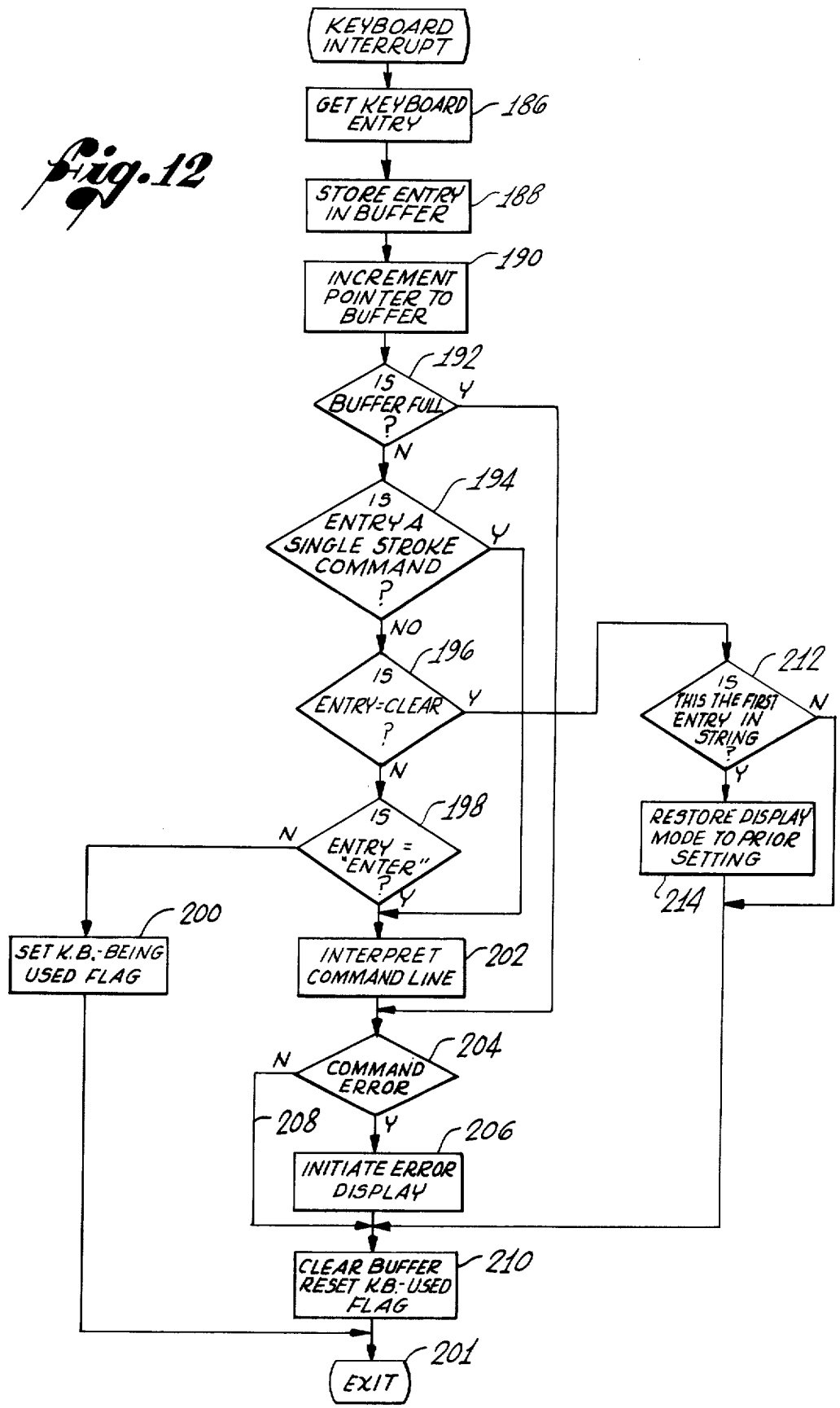

The steps of processing a keyboard interrupt are shown in detail in FIG. 12. First, in block 186 a coded equivalent of the keyboard entry is obtained, then, in block 188 it is stored in the keyboard buffer 116 (FIG. 9) and a pointer to the buffer is incremented as indicated in block 190. Then, as indicated in block 192, a determination is made as to whether the keyboard buffer is full. If it is not, the keyboard entry is examined in block 194 to determine whether it represents a single-stroke command. It will be recalled that certain of the keys, such as START, CANCEL, HOLD, and INTERRUPT represent complete keying sequences in themselves, requiring no further keys to be actuated. If the keyboard entry is not the result of a single-stroke command, a check is made to determine if it is derived from actuation of the CLEAR key, as indicated in block 196. If the entry is not the result of actuating the CLEAR key, a further check is made, in block 198, to determine whether the ENTER key has been actuated. If it has not, then the key depressed is not the last key in a keying sequence, and a flag is set in block 200 to indicate that the keyboard is being used, and exit is made from the keyboard interrupt routine as shown at 201.

What has been accomplished up to this point in the keyboard interrupt sequence is the entry of one keyboard character into the keyboard buffer 116 (FIG. 9). When the next key to be actuated in a keying sequence causes a further keyboard interrupt, control will again be transferred to the processing functions of the keyboard service module shown in FIG. 12, and the same questions will be posed in blocks 192, 194, 196 and 198. Each time the keyboard interrupt routine is activated, a further character is read in this manner from the keyboard and placed in the keyboard buffer 116 (FIG. 9). When the end of a keying sequence is reached, the last key to be actuated will be the ENTER key, and an affirmative answer will be obtained from the question posed in block 198, at which point the entire command line then stored in the keyboard buffer 116 will be interpreted, as indicated in block 202. Next, after the line has been interpreted a check is made in block 204 to determine if there has been any error in the command structure. If there has, an appropriate error display message is set up in block 206, and if not, block 206 is bypassed as shown by line 208. Finally, in block 210, the input buffer 116 is cleared, and the flag which was set in block 200 is also cleared, to indicate that a complete string of keyboard commands has been entered. Then, exit is made as shown at 201.

The effect of actuation of the CLEAR key is shown by blocks 212 and 214. If the CLEAR key has been actuated, as determined in block 196, control is transferred to block 212, where it is determined whether the CLEAR key is the first entry in a keying sequence or string. If it is not, control is transferred immediately to block 210, where the input buffer is cleared and exit is then made. This is the situation when an operator actuates the CLEAR key midway through a keying sequence, indicating that he has made an error and wishes to start the sequence over again. If, however, the CLEAR key is the first one actuated in a command sequence, this indicates a different function of the CLEAR key, requiring, as indicated in block 214 that the mode of operation of the display be restored to its setting prior to the current keyboard operation.

If the first entry in a keying sequence is a single-stroke command, as determined in block 194, control is transferred directly to block 202 to interpret the single-stroke command sequence or line. If the keyboard buffer 116 is full, as determined in block 192, control is transferred to block 204 to determine if there was a command error, as will usually be the case.

Figure 13:
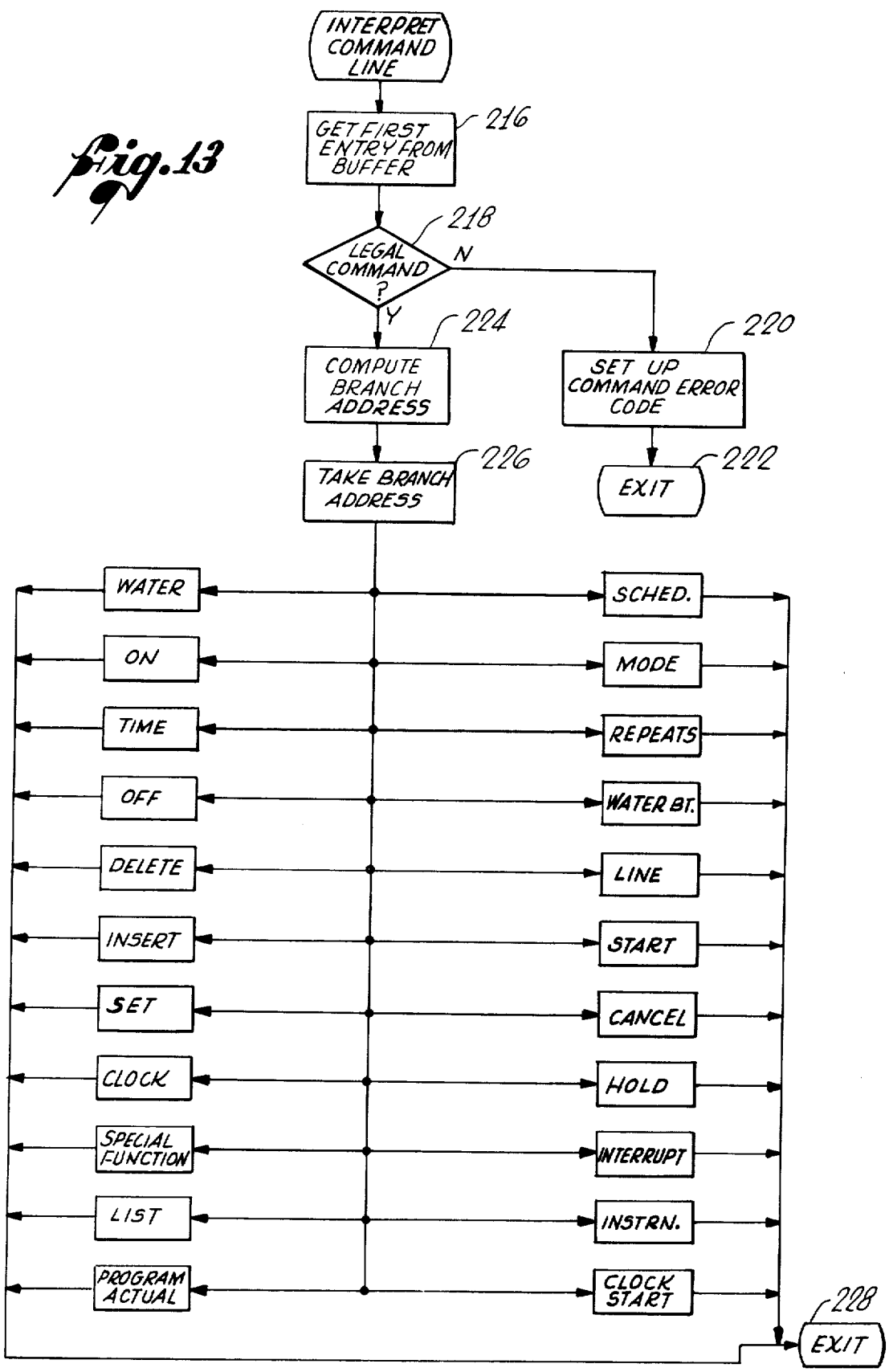

The process of interpreting a command line, as indicated generally in block 202, is shown in more detail in FIG. 13. Initially, the first entry from the keyboard buffer 116 is obtained, as shown in block 216. Then, a check is made, as shown in block 218, to determine whether the command is a legal one. If it is not, a command error code is generated, as shown in block 220 and exit is made as shown at 222. The error will then be detected upon return to the processing sequence shown in FIG. 12, in block 204, and an appropriate error display will be initiated in block 206. If the command is legal, as determined in block 218, a branch address is computed, as shown in block 224, and control is transferred to the branch address as shown in block 226.

The branch address taken from block 226 is determined by the first key forming part of a legal keying sequence or command string. It will be appreciated from the description of the keyboard functions that the possible processing paths correspond to the following keys: SCHED., MODE, REPEATS, WATER BUDGET, LINE, START, CANCEL, HOLD, INTERRUPT, INSTR., CLK. START, WATER, ON, TIME, OFF, DELETE, INSERT, SET, CLOCK, SPEC. FUNCTION, LIST, and PROGRAMMED/ACTUAL.

The SCHED. key is in many respects the most powerful key, since it begins a command string which locates existing schedules or reserves memory space for new ones. As discussed in relation to the keyboard shown in FIG. 3, after the SCHED. key has been used to select a particular schedule for further manipulation, various other keying sequences are then possible, some of which may be performed in any system mode, and some of which may be performed only in the program mode. After a particular keying sequence has been processed, return is made from the command line interpreting routine, as shown at 228. The interpretation of each of the commands will now be discussed in datail.

Figure 14:
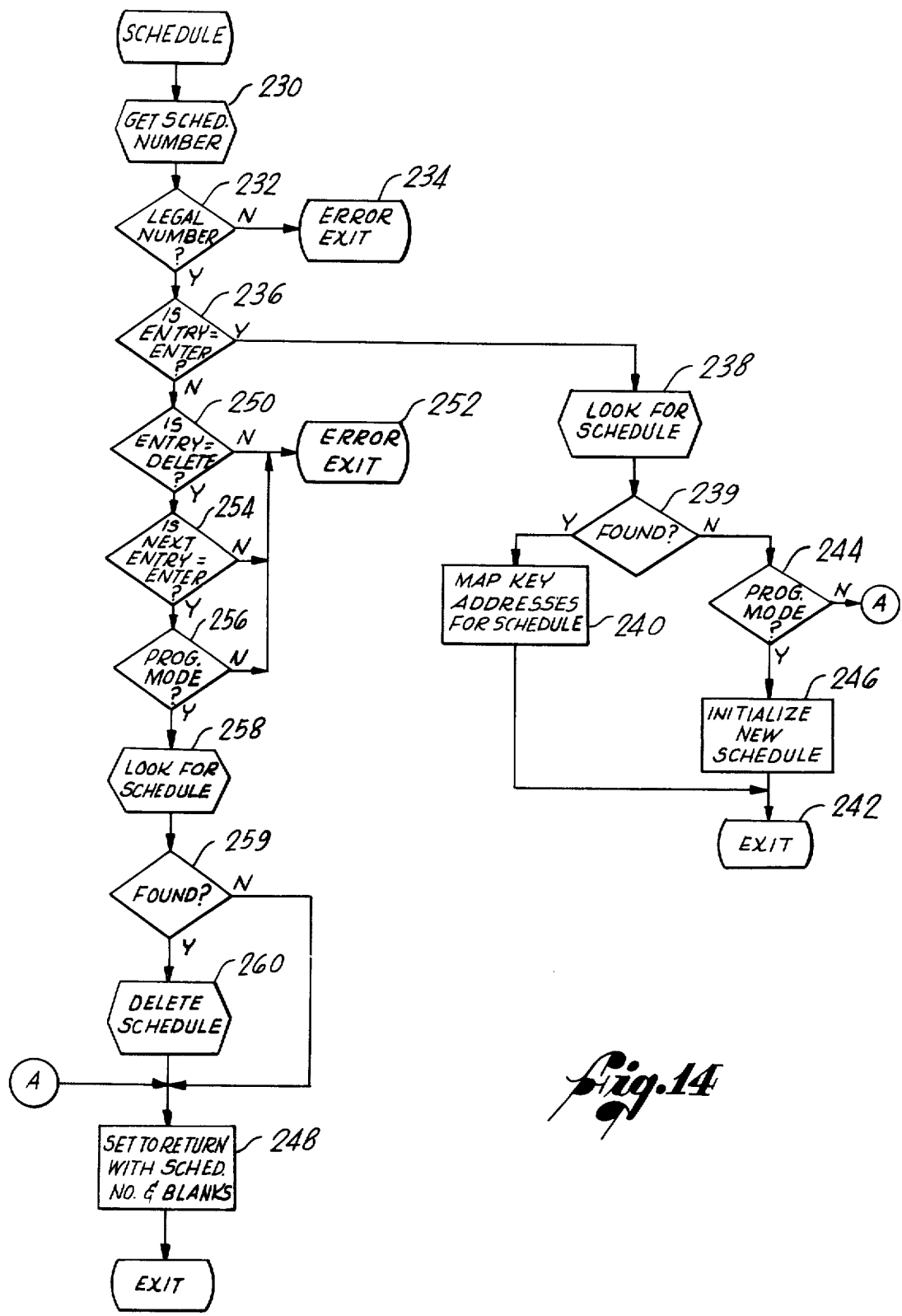

The schedule command (SCHED.) causes the functions described in FIG. 14 to be performed. First, the schedule number associated with the SCHED. keying sequence is retrieved from the keyboard buffer 116 (FIG. 9), as shown at 230. Then the legality of the schedule number is checked in block 232, and if the number is illegal an error exit is taken as shown at 234. Then, as shown at block 236, the next keyboard entry in the keying sequence is checked to see if it corresponds with the ENTER key. If it does, a search is made of the schedule storage module 102 (FIG. 9), as shown at blocks 238 and 239. If the schedule is found, as determined in block 239, certain key addresses related to the schedule are mapped into a convenient portion of the memory, as shown at block 240, and exit is made, as shown at 242. If the schedule is not found, the system mode is checked, as shown at block 244, to determine whether the system is in program mode. If it is, a new schedule is initialized, as shown at block 246, before exit is made as shown at 242. If the requested schedule is not found, and the system is not in program mode, transfer is made to a block indicated by reference numeral 248, from which a return is made with blanks stored for display in the display fields other than the field used to display the schedule number.

The description of the schedule key processing thus far has covered the functions performed when either an existing schedule is retrieved or a new one is initialized. The SCHED. key may also be used to delete an entire existing schedule by entering the schedule number after the SCHED key, and then actuating the DELETE key and the ENTER key. If the ENTER key does not follow the schedule number as determined in block 236, a check is made in block 250 to determine if the DELETE key follows the schedule number. If it does not, an error exit is taken as shown at 252. If the DELETE key has been actuated after the schedule number, a check is made to confirm that the ENTER key has been next entered to terminate the keying sequence, in block 254. If not, the error exit at 252 is again taken. Finally, in block 256 a check is made to determine whether the system is in program mode. If not, the error exit at 252 is again taken. The schedule to be deleted is searched for in blocks 258 and 259, and, if found, is deleted in block 260, return being made with the schedule number displayed only.

Each schedule is stored in the schedule storage module 102 (FIG. 9) in the format illustrated in FIG. 15. The format is byte-oriented, consistent with the memory structure of a typical microprocessor. Each byte is eight bits long, and the first thirteen bytes of each schedule are referred to as a schedule overhead, and are used to store schedule-specific parameters. As shown in FIG. 15, byte #1 contains the schedule number, byte #2 is presently unused, and byte #3 contains the schedule mode and status information. The mode is the programmed schedule mode, i.e., whether automatic, semi-automatic, or manual, and whether saved. The status information indicates whether the schedule is on, and, if it is, whether it is in the hold or interrupt status and, if so, whether the hold or interrupt status was manually initiated. Byte #4 contains a control status word which represents an input from the two-wire encoder unit 46 (FIG. 1). Byte #5 contains the number of times that the schedule is to be repeated, once initiated or turned on, and byte #6 contains a repeat counter indicating the number of times that it has been repeated. Bytes #7 and #8 contain the water budgeting factor and byte #9 contains a step counter indicating the number of the currently executing step or instruction in the schedule. Byte #10 contains a time/event flag which, if set, indicates that the schedule is currently executing a TIME instruction or a COUNT instruction. Finally, bytes #11–13 contain a time/event counter for use by TIME and COUNT instructions in the schedule.

Beginning at byte #14 of the schedule storage area are the actual schedule statements, which may be control statements or step statements, in any intermixed arrangement. It will be recalled that control statements are instructions which affect the schedule as a whole, whereas step statements are sequentially executed instructions in an ordered sequence which forms the schedule. The specific formats of the control and step statements is given in Table I. Note in FIG. 15 that the end of a schedule is signified by the presence of a particular delimiting character. The end of the storage area of all of the schedules is signified by two such consecutive delimiting characters. As already outlined, when the SCHED. key and a schedule number are entered into the keyboard, and no schedule of that number already is stored, a new schedule area is set up in the format shown in FIG. 15. Subsequently, the operator may begin programming the schedule by entering the instructions sequentially.

Schedule instructions are entered by entering an instruction code and a following sequence of instruction arguments or parameters. The instruction code is entered either by actuating the INSTR. key followed by a numeric code, or, as in the case of certain frequently used instructions, actuating the CLK. START, WATER, ON, TIME or OFF key, with no following numeric code being necessary.

Figure 16:
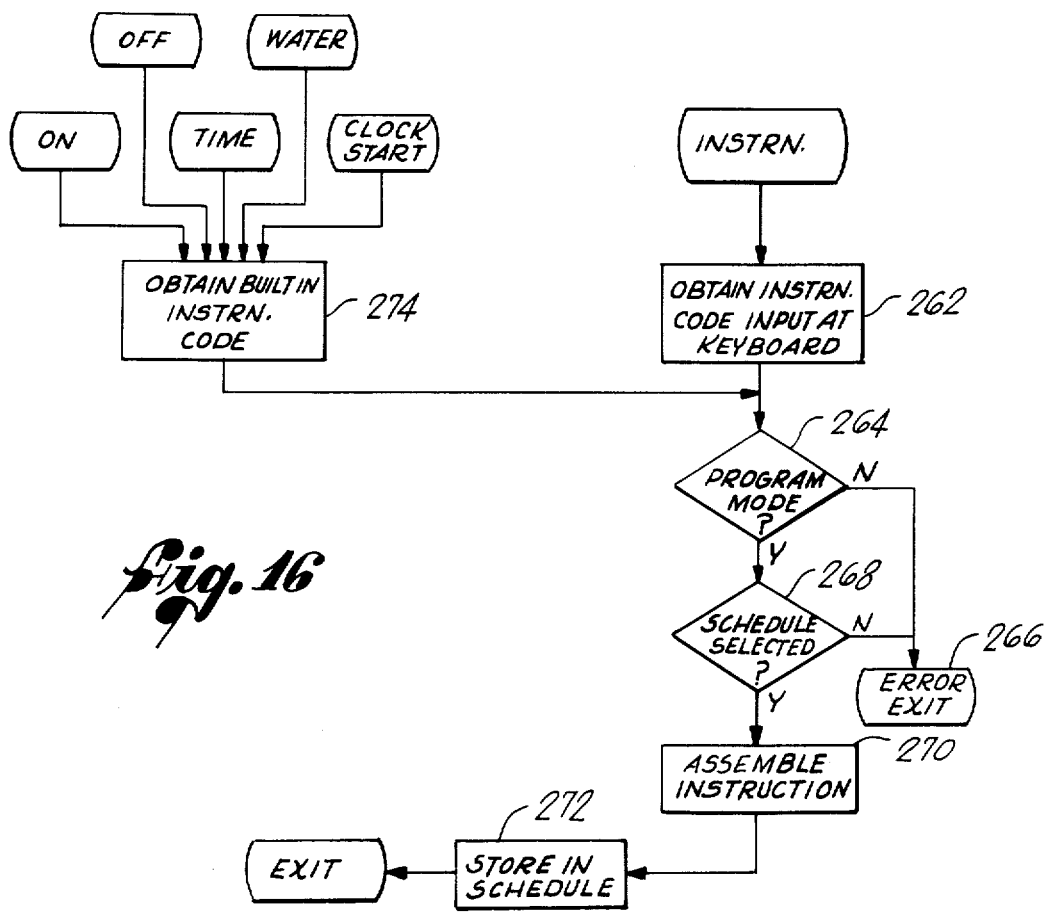

The instruction key (INSTR.) is interpreted as shown in FIG. 16 by first obtaining the input instruction code, as indicated at block 262, then checking to determine if the system is in program mode, as indicated at block 264. If the system is not in program mode, an error exit is taken as shown in block 266. If the system is in program mode, a further check is made, at block 268 to determine if a schedule has been selected prior to actuation of the INSTR. key. If no schedule has been selected, again the error exit is taken as shown at 266. If a schedule has been selected, the instruction is assembled, as shown at block 270 and is stored in the schedule as shown in block 272, prior to exiting from the routine. The ON, OFF, TIME, WATER and CLK. START keys each have associated with them a built-in instruction code which is first obtained, as indicated at block 274, before transferring control to the INSTR. key processing sequence at block 264, where a check is made to determine if the system is in program mode.

Assembly of an instruction involves forming a hexadecimal string of data in accordance with the stored format of the instruction, as indicated in Table I. For example, if the ON instruction is entered through the keyboard, the instruction is assembled by forming the string E0XX, where XX represents the number of the valve to be turned on by the instruction.

It will be noted from Table I that a number of instructions require that they be immediately proceeded by a DEFINE INPUT instruction, which is used to specify the number of the input which is to be sensed in conjunction with the instruction which follows it. For example, a SENSOR START instruction results in automatic starting of a schedule if the sensor indicated by the input number defined in the previous instruction changes to an "on" condition. In effect, then, the DEFINE INPUT instruction is not really an instruction in the same sense of the other instructions, but is merely a means for inputting an argument or parameter for the instruction which follows.

Interpreting command lines beginning with keys other than the ones described thus far can be adequately described verbally without reference to flow charts. For example, interpreting a MODE command requires identification of the next following key in the keying sequence, in order to determine the new mode being selected. The new mode is then stored in the schedule mode/status word and is also automatically displayed on the control panel.

Similarly, commands involving the REPEATS key and the WATER BUDGET key are analyzed first to determine if the repeats or water budget parameters are to be merely displayed or whether they are to be modified. If they are to be displayed, as indicated by the ENTER key immediately following the initial command key, the appropriate parameter is retrieved from the schedule storage area and displayed. Newly entered parameters are both displayed and used to revise the values stored in the schedule.

The effect of the LINE or LINE ADVANCE key when the system is in LIST mode is to advance the schedule to the next line to be listed. Alternatively, a desired line can be displayed (listed) by actuating the LINE key, followed by the desired line number and the ENTER key.

The effect of the START and CANCEL keys is to manually turn the schedule on or off, and this is achieved by appropriately modifying the schedule mode/status word. Similarly, the HOLD and INTERRUPT keys have the effect of modifying the hold and interrupt bits in the mode/status word of the schedule. Both the HOLD and INTERRUPT keys have a toggle effect, i.e., a schedule can be restarted from the "hold" status by actuating the HOLD key again, or restarted from the "interrupt" status by actuating the INTERRUPT key again.

The DELETE and INSERT keys can be utilized to delete or insert instructions in a schedule. When the DELETE key is actuated, the line or instruction currently being displayed in list mode is deleted from the schedule. When the INSERT key is actuated, instructions subsequently entered are inserted prior to the one currently being displayed. As already described, the DELETE key can also be used in conjunction with the SCHED. key to delete an entire schedule.

Actuation of the CLOCK key causes the display to show the time of day. The time of day can be reset by actuating the SET key, followed by the time parameters to be entered. For example, "DAY 4 HOUR 5 MIN 30 PM".

Actuation of the special function key (SPEC. FUNCTION) followed by a key designating a selected special function, causes the sytem to perform that function, as described in relation to the keyboard.

Actuation of the LIST key toggles the list/monitor status of the system, i.e., switches the system to or from list mode. It will be recalled that, in list mode, the currently selected schedule is listed line by line, and may be advanced to the next line by depressing the LINE ADVANCE key, or to a selected line by using the LINE key and entering a line number. In monitor mode, an executing schedule will be displayed at its currently executing instruction.

The PROGRAMMED/ACTUAL key causes the system to toggle between two different display modes one of which displays a programmed count, for example a TIME instruction with the programmed time displayed, and the other displays an actual or real-time count, meaning the time remaining to be counted down. The actual count can be modified to any desired value by actuating the SET key, followed by the new actual value and the ENTER key. The new actual value will then be used in the execution of the TIME or COUNT instruction, but the programmed value will remain intact and will be used on the next occasion that the instruction is executed.

This completes the description of the keyboard functions. It will now be apparent that, by appropriate manipulation of the keyboard controls, schedules may be added to the system, deleted, or modified. It only remains to discuss how the schedules are executed, and this is basically a function of the time interrupt routine illustrated in FIG. 17.

When a time interrupt is processed, indicating that a selected time, typically one second, has elapsed since the previous time interrupt, the first function to be performed is updating clock counters, as indicated at 280. The clock counters maintain counts in days, hours, minutes and seconds, and are used for a variety of purposes, such as displaying the time of day and, more importantly, for comparison with parameters provided with clock start (CLK. START) and TIME instructions to determine whether a schedule is to be started or continued. After updating the clock counters, the time interrupt routine clears the output buffer 112 (FIG. 9), as shown at 282, and then services all of the schedules which are in the "on" condition, by executing them against the output buffer, as indicated at block 284. Exit is then made back to the interrupted sequence. In executing the schedules against the output buffer, all of the executable steps or step statements in each schedule are re-executed. Executable instructions do not include control instructions, which affect the schedule as a whole, and do not include TIME and COUNT instructions, since these would involve a long time delay and would not affect the output data image. The executable instructions are the ON and OFF instructions, and these are re-executed from the first instruction in the schedule to the current instruction in the schedule. After such re-execution, the contents of the output buffer is thereby completely refreshed and contains the desired output data image as of the time of the current step in the schedule. Since the process of servicing the schedules is a significant aspect of the invention, it is illustrated in further detail in FIGS. 18 and 19.

In servicing the schedules, initialization is first performed, in block 286, to retrieve and examine the first stored schedule in the schedule storage module 102 (FIG. 9). A check is then made to determine if the end of the storage schedule area has been reached, as indicated in block 288. If it has, an exit is made, as indicated at 290. If a schedule is found, key addresses of the schedule are mapped for convenience, as shown at block 292. Then the control statements are serviced, as shown at block 294 and in more detail in FIG. 19. After servicing the control statements, further checks are made, at block 296 to determine whether the control switch is on, at block 298 to determine whether the schedule is on, and at block 300 to determine whether the schedule has been interrupted. If the control switch is not on, or if the schedule is off, or if the schedule has been interrupted, control is transferred to block 302, which advances to the next schedule and transfers control back to block 288 to continue servicing the schedules. If the control switch is on, and the schedule is on, and the schedule has not been interrupted, all executable steps are serviced as shown in block 304 and as will be further described with reference to FIG. 20. Then the next schedule is located in block 302, and the process is repeated by transferring control back to block 288.

FIG. 19 shows in further detail how the control statements are serviced. First, the next statement is obtained, initially the first statement, as shown in block 306. Determination is made in block 308 whether the statment obtained is a control statement. If it is, the control statement is interpreted, as indicated at block 310. This involves obtaining an input valve, a clock valve, or a count value as needed, as indicated at block 312, and executing the control statement and updating the schedule status as required, as indicated at block 314.

For example, if the control statement to be interpreted is a clock start (CLK. START) statement, the current time of day is obtained from the clock counters and is compared with the time parameters accompanying the CLK. START instruction. If it is time to start the schedule, the schedule mode/status word is appropriately modified. In similar fashion, if the control instruction involves a sensor input, such as SENSOR CANCEL or SENSOR ADVANCE, the appropriately numbered input is obtained from the input buffer 114 (FIG. 9) and its status is examined. If the input status indicates that the status of the schedule should be changed, then it is appropriately changed. Likewise, in executing control statements involving the logging of time or a scheduled count, the appropriate input is obtained as required, and the count is updated as specified in the parameters of the control instruction.

After each control statement has been interpreted in blocks 310, 312 and 314, control is transferred back to block 306 to obtain the next statement. If a statement obtained in block 306 is not a control statement, as determined in block 308, a check is made to determine whether the end of the schedule has been reached, as indicated at block 316. If it has, exit is made, as indicated at 318. If not, control is transferred back to block 306 to obtain the next statement. Accordingly, it will be seen that the routine illustrated in FIG. 19 processes only control statements and bypasses step statements.

Executable steps are interpreted as shown in FIG. 20. First, a "current" flag is cleared, as shown in block 320. As indicated in the figure, the current flag is an indication that the schedule has been re-executed right up to the current statement in the schedule. Accordingly, when entering the routine to service executable steps, the "current" flag is cleared, indicating that the schedule has not been executed up to the current step. Next, as shown at block 322, a temporary step counter is cleared. Clearly, if the steps in the schedule are to be re-executed there has to be some means of counting the re-executed steps, as distinguished from the actually executed steps corresponding to the current step of the program. Next, the question is asked, at block 324, whether the step counter, i.e., the counter which indicates the currently executing instruction, is zero. If it is zero, this indicates that the schedule is just beginning execution. The next action is to increment the step counter, as shown at block 326, and then to increment the temporary step counter as shown at block 328.

Next, in block 330, the temporary step counter and the step counter are compared to determine if they are equal. If they are, the "current" flag is set in block 332 and if they are not, block 332 is bypassed. Then, in block 334, the next step, i.e., the one indicated by the current value of the temporary step counter, is obtained. In block 336, it is determined whether the end of the schedule has been reached. If it has not, the step under consideration is examined, in block 338, to determine whether it is a control statement. If it is, control is transferred back to block 334 to find the next step, thereby bypassing control statements. So long as a step instruction is located as determined in block 338, the instruction is interpreted and executed, as indicated in block 340, then a question is posed to determine whether the step is complete, as shown in block 342.

If the step just interpreted and executed is complete, the "current" flag is then checked in block 344. If the "current" flag is not set, this indicates that the instruction just executed was one prior to the current instruction, so control is transferred back to block 328 to increment the temporary step counter and proceed to obtain and execute the next step. If the "current" flag is set, as determined in block 344, this indicates that the current instruction has just completed execution. A determination must now be made whether to advance to the next instruction. A question is next asked, in block 346, to determine whether the system mode or schedule mode indicate a manual condition. If so, no further execution is performed, and exit is made as shown at 348. If neither the schedule-specific mode nor the system mode indicates a manual condition, a further check is made in block 390 to determine whether the schedule is in hold status. If it is, exit is also made as shown at 348. If the schedule is not in hold status, transfer is made back to block 326 to increment both the step counter and the temporary step counter, and thereby to advance to the next executable step in the schedule.

The effect of the functions illustrated in FIG. 20 is to execute all of the executable steps from the first step down to the current step. Operation of the schedule service module 100 (FIG. 9) can best be understood by considering what would happen in FIG. 20 if entry were made to the flow chart at the beginning of a schedule's execution, i.e., when a schedule has just been turned on and its step counter is at zero. The step counter would be incremented to one in block 326, and the temporary step counter would also be incremented to one in block 328. Then the "current" flag would be set in block 332, since the step counter would then be equal to the temporary step counter, and the first step of the schedule would be executed in block 340. If the first step happened to be an ON or OFF instruction, the response to the question posed in block 342 would be that the step was immediately complete. Then, if the schedule was not in manual mode or hold status, control would be transferred back to block 326, to increment the step counter and the temporary step counter, and to proceed with step two in the schedule.

So long as the steps were immediately executable, they would be immediately executed in sequential fashion, following the decision path just described. As soon as a current TIME or COUNT instruction was encountered, however, the answer to the question posed in block 342 would be that the step was not complete, since a time delay would be involved, and an exit would be made as indicated at 348, without further incrementing the step counter. On the next occasion that the flow chart of FIG. 20 was executed, which would be at the time of the one-second time interrupt, the temporary step counter would be set to zero, in block 322, but the step counter would not be zero and would not be incremented in block 326. Instead, the temporary step counter would be advanced to one and the first instruction would be executed again. Then the second, and so on until the current instruction was reached. If the current instruction was still incomplete, as indicated by block 342, exit would be made through block 348. It will be apparent, then, that the effect of the described routine to service executable steps is to execute the steps from the beginning of the schedule through to the current scheduled step, and, if the current schedule step happens to be complete, it will execute the next schedule step also. If the next schedule step is immediately executable, such as an ON or an OFF instruction, the next following step will also be executed, and so on up to the next step which is not immediately executable, such as a TIME instruction. When the end of the schedule is reached, as indicated by block 336, the schedule will be turned off if it is not to be repeated, as indicated by block 352, and exit will be made as shown at 354. In block 352, the saved/not-saved status of the schedule is examined and, if the schedule is not to be saved, it is purged from the system before exiting as shown at 354.

As shown in FIG. 21, each executable step is interpreted by first computing a branch address as shown at block 356, and then branching, as shown at block 358, to execute a particular step, such as ON, OFF, TIME, COUNT, or WATER. As shown at 360, return is made to the calling program in FIG. 20 after execution of the appropriate instruction.

FIG. 22 shows execution of the ON instruction. All that is involved is setting the appropriate bit in the output buffer 112 (FIG. 9) to indicate that a particular valve is to be turned on. Likewise, executing the OFF instruction is shown in FIG. 23 to involve clearing an appropriate bit in the output buffer 112 to indicate that a particular valve is to be turned off. Before exiting from the routines which execute the ON and OFF instructions a "complete" flag is set for use in the block 342 of FIG. 20.

Executing the TIME instruction, as shown in FIG. 24, entails first checking the "current" flag, as indicated in block 362. If the "current" flag is not set, this indicates that the TIME instruction is not currently being executed, and that it should not be actually executed at all in this pass of he TIME execution program. Accordingly, if the "current" flag is not set, the "complete" flag will be set, as shown at block 364, and exit from the routine will be made as indicated at 366. If the "current" flag is set, indicating that the TIME instruction is to be currently executed, the "hold" status is checked in block 368. If the schedule is in "hold" status, transfer is made to block 364, since the instruction is not to be executed. However, if the "current" flag is set and the schedule is not in a "hold" status, the question is then asked, at block 370, whether the TIME instruction has already begun execution. This is indicated by the time/event flag in the schedule storage area. If the TIME instruction has not already begun execution, the time parameter supplied with the instruction is multiplied by the water budgeting factor, as shown in block 372, the time counter in the schedule storage area is initialized, and the time/event flag is set, as indicated in block 374. Then exit is made from the routine as indicated at 376.

If the TIME instruction is already being executed, as determined in block 370, the time counter is decremented by one unit of time, as indicated at block 378, and a check is made in block 380 to determine if the count has reached zero. If it has not, exit is made from the routine, as indicated at 382. If the time has been decremented to zero, the time/event flag is cleared, as indicated in block 384 and the "complete" flag is set, as indicated in block 386, before exit is made as indicated at block 382.

The COUNT instruction is executed as shown in the flow chart of FIG. 25. First, the "current" flag is checked, as indicated in block 390, and if it is not set, exit is made after first setting the "complete" flag as shown in block 392. If the "current" flag is set, indicating that the COUNT instruction is to be currently executed, the input number to be counted is obtained, as indicated in block 394, and if it is found, as determined in block 396, a further check is made in block 398 to determine whether the instruction is already counting. This is determined by the status of the time/event flag in the schedule storage area. If the instruction is not already counting, the count value is initialized and the time/event flag is set, as indicated in block 400. If the instruction is already counting the step in block 400 are bypassed. In block 402, which follows, the input specified in the DEFINE INPUT instruction preceeding the COUNT instruction is checked to determine its status. If its status indicates that it has not been turned on since the last time it was checked, exit is made as indicated at 404. If the input is on, and was switched to "on" since the last time it was checked, the counter is decremented, as shown at block 406 and then checked for zero in block 408. If the counter has not been decremented to zero, exit is made immediately, but if the counter has been decremented to zero the "complete" flag is set and the time/event flag is cleared, as indicated in block 410. It will be appreciated that the effect of the COUNT execution routine is to count the number of times that the input is set to an ON condition, indicating an incremental parameter value, such as volumetric flow.

Implied in operation of the COUNT instruction, as well as in the logging control statements, is the limitation that the input being monitored will change states at a rate slower than the rate at which it is sampled by the COUNT instruction. This limitation may require rapidly changing sensor input signals to be scaled down by appropriate counting logic located at the sensor.

The WATER instruction utilizes the execution routines for the TIME instruction, the ON instruction and the OFF instruction, as shown in FIG. 26. First, a TIME instruction is executed as indicated at block 412, and then in block 414 a check is made to determine whether the TIME instruction is complete. It will be recalled that the TIME instruction contains a check on the "current" flag, and if the "current" flag is not set, the "complete" flag will be set and an immediate return will be made. It will therefore be apparent that, if a non-current WATER instruction is executed, the response to the question posed in block 414 will be that the time is complete. The OFF instruction will then be executed, as shown at 416, and exit will be made from the WATER instruction as shown in 418.

If the WATER instruction is a current instruction, however, the response to the question posed in 414 will be that the time instruction is not complete. Accordingly, the ON instruction will be executed, as shown at block 420, and exit will be made as shown in 418. On subsequent passes through the currently executing WATER instruction, on subsequent time interrupts, the TIME instruction will still be incomplete, and the ON instruction will be reexecuted in block 420. Eventually, when the TIME instruction is complete, the OFF instruction will be executed in block 416, and exit will be made as indicated at 418. Since execution of the ON instruction will normally set the "complete" flag, the "complete" flag must be cleared, as shown in block 422, after executing the ON instruction and before exit. Then the exit will be made with the "complete" flag not set so long as the TIME portion of the instruction has not been completed. When the TIME portion of the instruction is eventually completed, execution of the OFF instruction will automatically set the "complete" flag before final exit.

Figure 27:
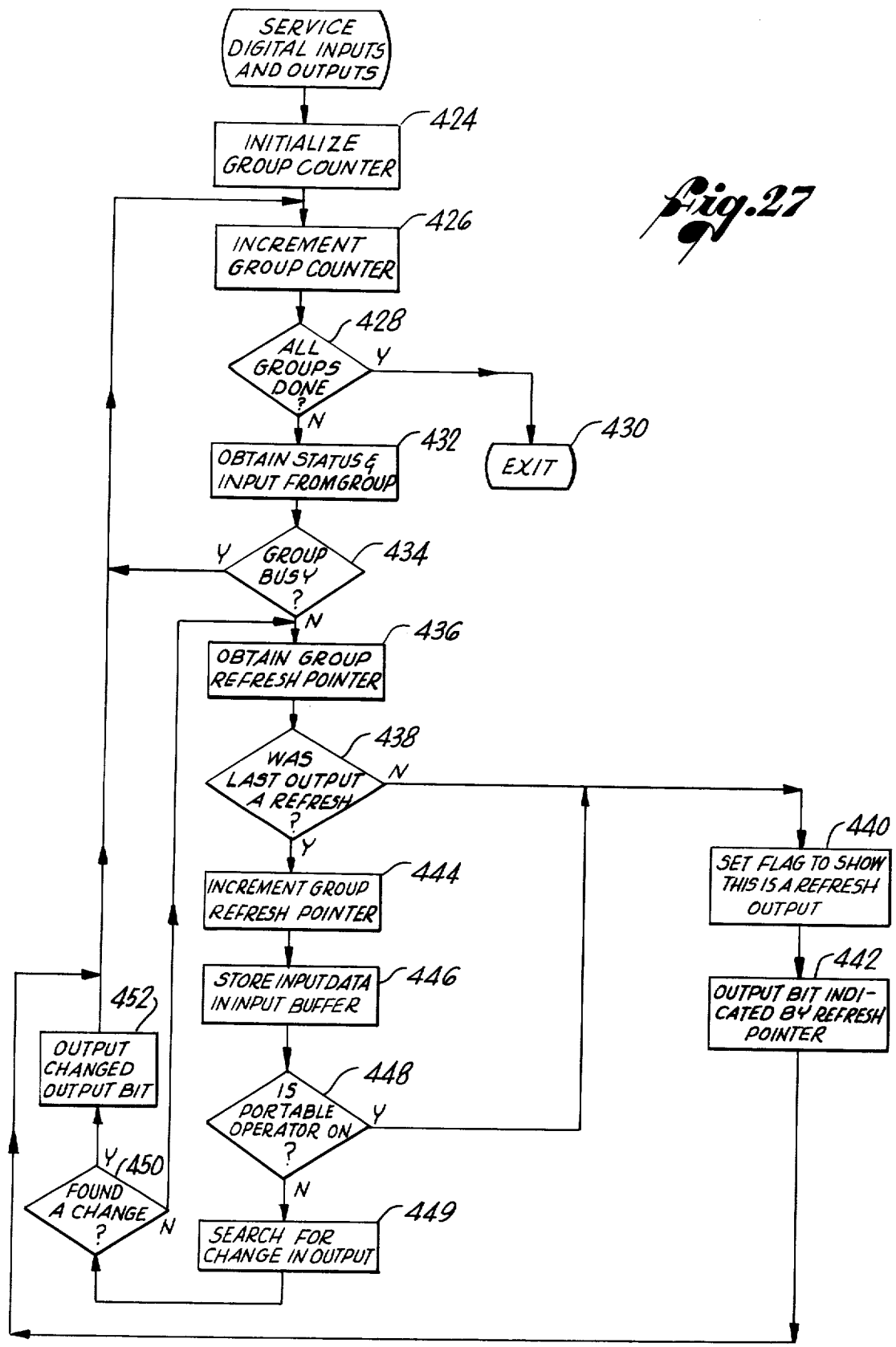

It will be recalled from FIG. 10 that the digital outputs and inputs are serviced in the main or background loop of controller functions, at block 172. This function of servicing inputs and outputs is illustrated in more detail in FIG. 27. Since the digital input/output service module 106 (FIG. 9) communicates directly with apparatus outside of the controller, it is, by necessity, designed with the characteristics of the outside equipment in mind. As will shortly be described in relation to the two-wire system, the output devices or valves in the system, as it is presently configured, are arranged in groups of thirty-two devices, and one characteristic limitation of the two-wire system is that it is possible to communicate with only one output device per group at any instant in time. Accordingly, the digital input/output service module 106 (FIG. 9), as further expanded in FIG. 27, operates to initiate an output in each group, and to maintain output activity in all of the groups.

More specifically, when the input/output service module 106 (FIG. 9) is activated, it initializes a group counter, as shown at block 424, and then increments the group counter as shown in block 426. In block 428 which follows, the group counter is checked to determine whether all groups have been processed and, if so, exit is made as indicated at 430. If all groups have not been processed, the status of the particular group indicated by the current value of the group counter is obtained, as indicated at block 432. As will become apparent when specific interface hardware is discussed, this latter step is performed by outputting address signals corresponding to the group number, and inputting in response a group of signals which indicate the status of that particular hardware group. One of the status signals which is obtained in this manner indicates whether the group is currently busy performing output operations.

If the group currently under consideration is busy, as determined in block 434, return is made to block 426 and the next group is checked, and so on until a non-busy group is located. If the group is not busy, as determined by block 434, a group refresh pointer is obtained, as indicated in block 436. As already mentioned, there are thirty-two output devices associated with each group, and the principal objective of the digital input-/output service module 106 (FIG. 9) is to refresh the outputs to these thirty-two devices as often as possible. To this end, a group refresh pointer is maintained to indicate which device in the group last had its output refreshed. After the refresh pointer is obtained, in block 436, a determination is next made as to whether the previous output was a refresh output, as indicated in block 438. This test ensures that if the previous output was not a refresh output, then the next output will be a refresh output, and thereby ensures that at least every alternate output transmission will be in the nature of a refresh output. Accordingly, if the last output was not a refresh output, control is transferred to block 440, where a flag is set to show that the output to be performed is a refresh output. Then, as indicated in block 442, a data signal is output as indicated by the refresh pointer, and control is transferred back to block 426 to increment the group counter and repeat the process for the next group. As will become apparent when the two-wire system is discussed in detail, the means by which the data signal is output in block 442 involves the setting up of a ten-bit address, a one-bit data signal, and the transmission of a strobe signal to effect the transfer of this information to a particular group encoder.

If the previous output was a refresh output, as determined in block 438, the group refresh pointer is incremented, as indicated at block 444, and a data input signal resulting from the previous refresh output is stored in the input buffer 114 (FIG. 9), as indicated in block 446. The data input signal, as will be explained in connection with the two-wire system, represents either a feedback signal indicating that the output data has been successfully acted upon, or represents a sensed input signal from a sensing device in the field.

After the input data has been stored in the appropriate position in the input buffer, a check is made in block 448 to determine whether the portable operator is connected to the group. This is a step relating to the specific hardware employed in the two-wire system, and its meaning will become clearer when the two-wire operation is discussed in more detail. For the moment, however, it need only be appreciated that the portable operator is a plug-in device which may be utilized in the field to override action of the central controller. When the portable operator is being used, it depends for its operation on having the output signals transmitted sequentially or cyclically, i.e., following the cyclicly incremented refresh pointer. Accordingly, if the portable operator is on, as determined in block 448, control will always be transferred to block 440, to output the data signals cyclically in accordance with the refresh pointer values. If the portable operator is not connected to the group, a search is next made for a difference in corresponding bits in the output and input buffers 112 and 114, as shown in block 449. Such a difference will exist, for example, when a particular bit, corresponding to a particular output device, has been switched to the "on" condition in the output buffer, but has not yet been output by the digital input/output service module 106 (FIG. 9). Rather than have the digital input/output service module 106 proceed in an entirely cyclic fashion, allowance is made for the early detection of newly changed output bits, so that these may be taken out of sequence and serviced earlier. This is consistent with the typical output pattern for the control of irrigation valves, wherein the valves are switched only one at a time, while the others remain in the same condition. If no changed outputs are located, as determined in block 450, control is transferred back to block 436 to obtain the group pointer and then to initiate another refresh output.

If a change in output data is found in block 450, the changed data bit is output, as indicated in block 452, and control is then transferred back to block 426, to increment the group counter and repeat the process for the next group. This process continues until outputs have been initiated on all groups, which were found to be not busy. The effect is that all groups are kept busy, and the content of the output buffer 112 (FIG. 9) is transferred to the corresponding output devices as rapidly as possible, limited only by the speed of the encoding devices employed, and input signals from the field, are also transferred to the input buffer 114 as rapidly as possible. Depending on the configuration of the devices in the field, the input buffer therefore represents either sensed input signals, or feedback signals confirming that the output devices have been appropriately switched.

Figure 28:
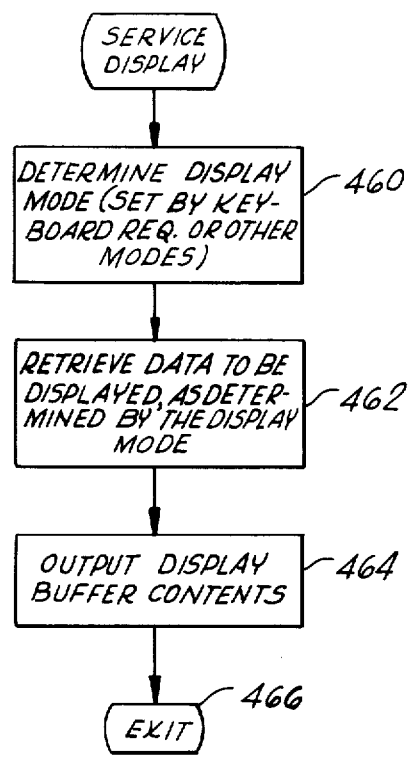
Figure 29:
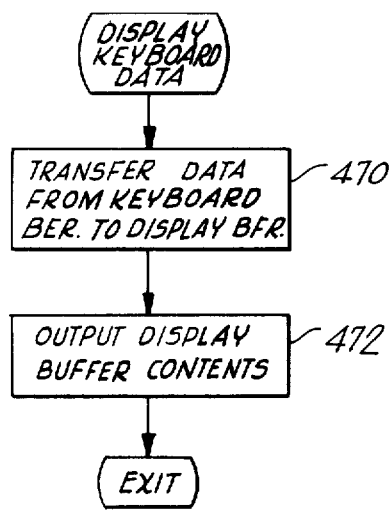

The only portions of the FIG. 10 flowchart of the main processing loop which have not yet been described in detail are the portions for servicing the display, indicated in block 170 and 168. FIGS. 28 and 29 illustrate these blocks in more detail. In normally servicing the display (FIG. 28), first a determination is made of the display mode, as indicated at block 460. The display mode is merely an internal flag set by various processing modules to indicate to the display service module 108 (FIG. 9) what information is to be displayed. In the next block 462, the appropriate data is retrieved and stored in the display buffer 118 (FIG. 9), and in the following block 464, the display buffer contents are output to the digital display 80 (FIG. 3) and exit from the display servicing routine is made, as indicated at 466. Included in the data retrieved for display is the updated mode and status information, which is also output to the display in block 464.

By way of example of how the display service module 108 operates, if the time of day is to be displayed, the display mode will be set to indicate this, by the keyboard service module 104 (FIG. 9) acting in response to actuation of the CLOCK key. If the display mode is set to display the time of day, the data retrieval and formatting step performed in block 462 involves obtaining the contents of the day, hour and minute clocks and appropriately formatting this data in the display buffer 118. The display mode is set to other conditions by various portions of the keyboard service module 104 in response to specific command sequences entered on the keyboard. Each display mode conditions the display service module 108 to retrieve data from a different source, and to format it in a particular manner.

As shown in FIG. 29, when a command sequence is being entered through the keyboard, as determined in block 166 in FIG. 10, data is transferred directly from the keyboard buffer 116 (FIG. 9) to the display buffer 118, as indicated in block 470 of FIG. 29. Then, the contents of the display buffer 118 are output to the digital display 80 (FIG. 3 ), as indicated in block 472, and exit is made as indicated at 474.

The foregoing description of the controller functions, taken together with the accompanying flow charts, are believed to be a sufficiently detailed description to enable a microprocessor programmer to program a microprocessor to perform the described functions of output, input, and interaction with an operator. Moreover, the description is also believed to be sufficient to enable a logic designer to build a completely hard-wired machine to perform the same functions.

5. The Two-Wire System

Figure 4:
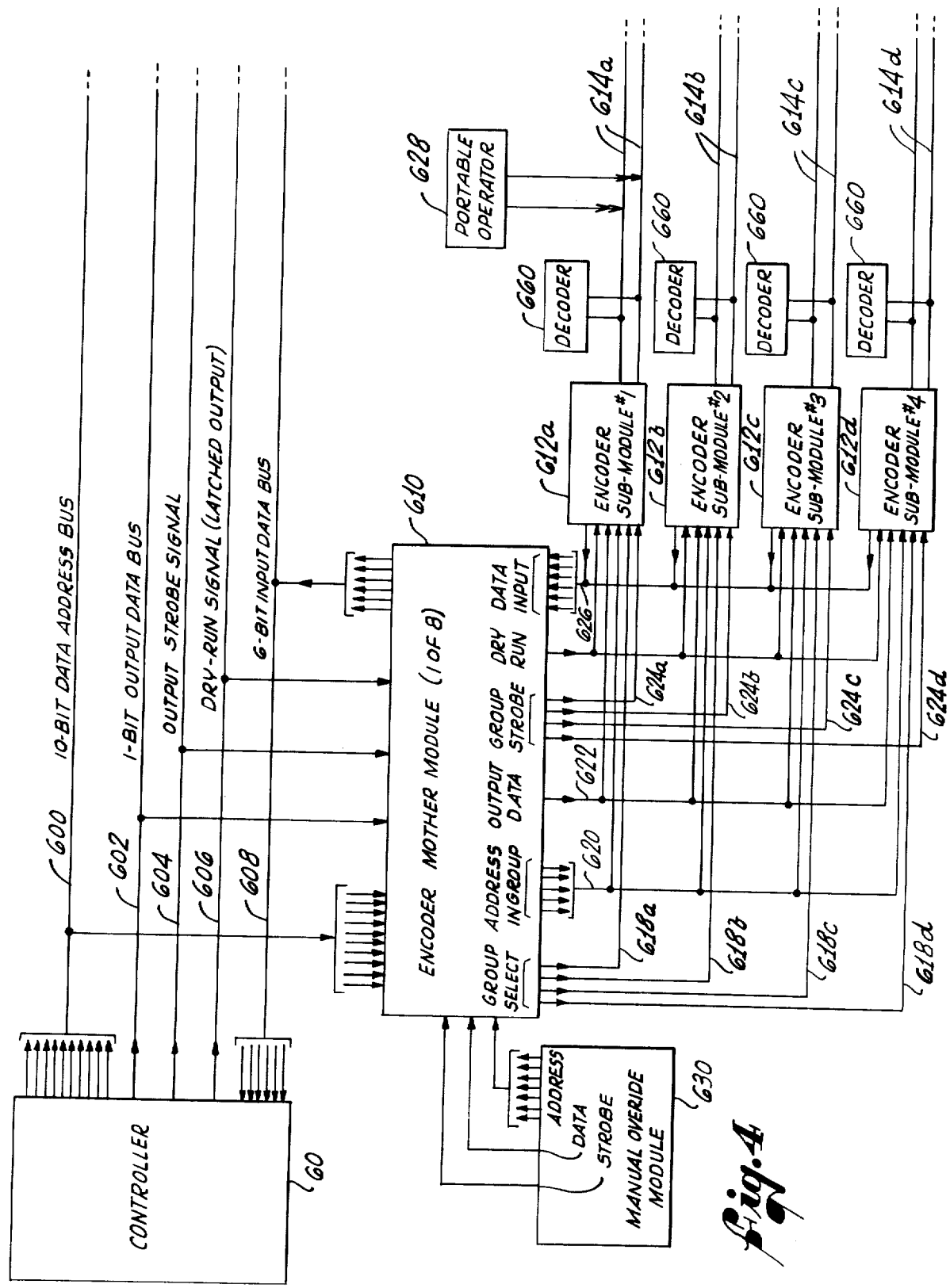
FIG. 4 is a block diagram of a two-wire irrigation control system of the type shown connected to the controller in FIG. 1.

It will by now be appreciated that the controller 60 of FIG. 1 has novelty and utility without reference to the two-wire system with which it communicates in the presently preferred embodiment of the invention. However, for completeness, and in order to describe one fully operative system, the apparatus external to the controller 60 will now be described in detail. This apparatus and the manner in which it interfaces with the controller 60 is illustrated in block diagram form in FIG. 4. The controller 60 has an input/output interface comprising a ten-bit data address bus 600, a one-bit output data bus 602, an output strobe signal line 604, a latched output line 606 for transmission of the dry-run signal, and a six-bit input data bus 608. As indicated in FIG. 4, all of the aforementioned buses and lines are connected to as many as eight encoder mother modules 610, only one of which is shown in FIG. 4, for reasons of clarity. Each encoder mother module 610 has associated with it four encoder submodules 612a, 612b, 612c, and 612d. Thus, there are thirty-two encoder submodules in all. Each encoder submodule has connected to it a pair of power lines 614a–614d, to which are coupled as many as thirty-two decoders 660, only one of which is shown on each pair of lines.

The encoder mother module 610 is essentially an addressing device. The three most significant address bits on the ten-bit address bus 600 determine which of the eight-mother modules 610 is to be activated. Then the next two significant bits on the ten-bit address bus 600 determine which of the encoder submodules 612 is to be activated, under the control of group selection signals on lines 618a–618d from the mother module 610 to the encoder submodules 612. The remaining five least significant bits in the ten-bit address bus 600 are transmitted through the mother module 610 to the encoder submodules 612 over lines 620. The output data bus signal on line 602 is also transmitted through the mother module 610, and to the encoder submodules 612 over lines 622.

The encoder mother module 610 generates group strobe signals on lines 624a–624d to the encoder submodules 612, and these are utilized to strobe the device address signals on lines 620 and the output data signal on line 622 into the appropriate encoder submodule 612. The group selection signals on lines 618a–618d select which submodule will provide a six-bit output on lines 626 for transmission back to the encoder mother module 610, and from there back to the six-bit input data bus 608, for input by the controller. A portable operator 628 may be plugged in at various field locations along the lines 614, and employed to override control signals emanating from the controller 60. The presence of the portable operator 628 will be sensed by the encoder submodule 612 to which it is connected, and signals relating to the presence of the portable operator, and to special functions selected at the portable operator, will be included in the six-bit input signal transmitted back along lines 626 to the encoder mother module 610.

Also associated with the encoder mother module 610 is a manual override module 630 which can be used to generate manually a seven-bit address signal, a one-bit data signal and a strobe signal, all of which are also transmitted to the encoder mother module. When the manual override module 630 is activated, a signal is also provided to the encoder mother module 610 and is utilized therein to select the address, data, and strobe signals provided from the manual override module, rather than those provided from the controller 60. This provides an optional means for manually overriding the controller.

Figure 5:
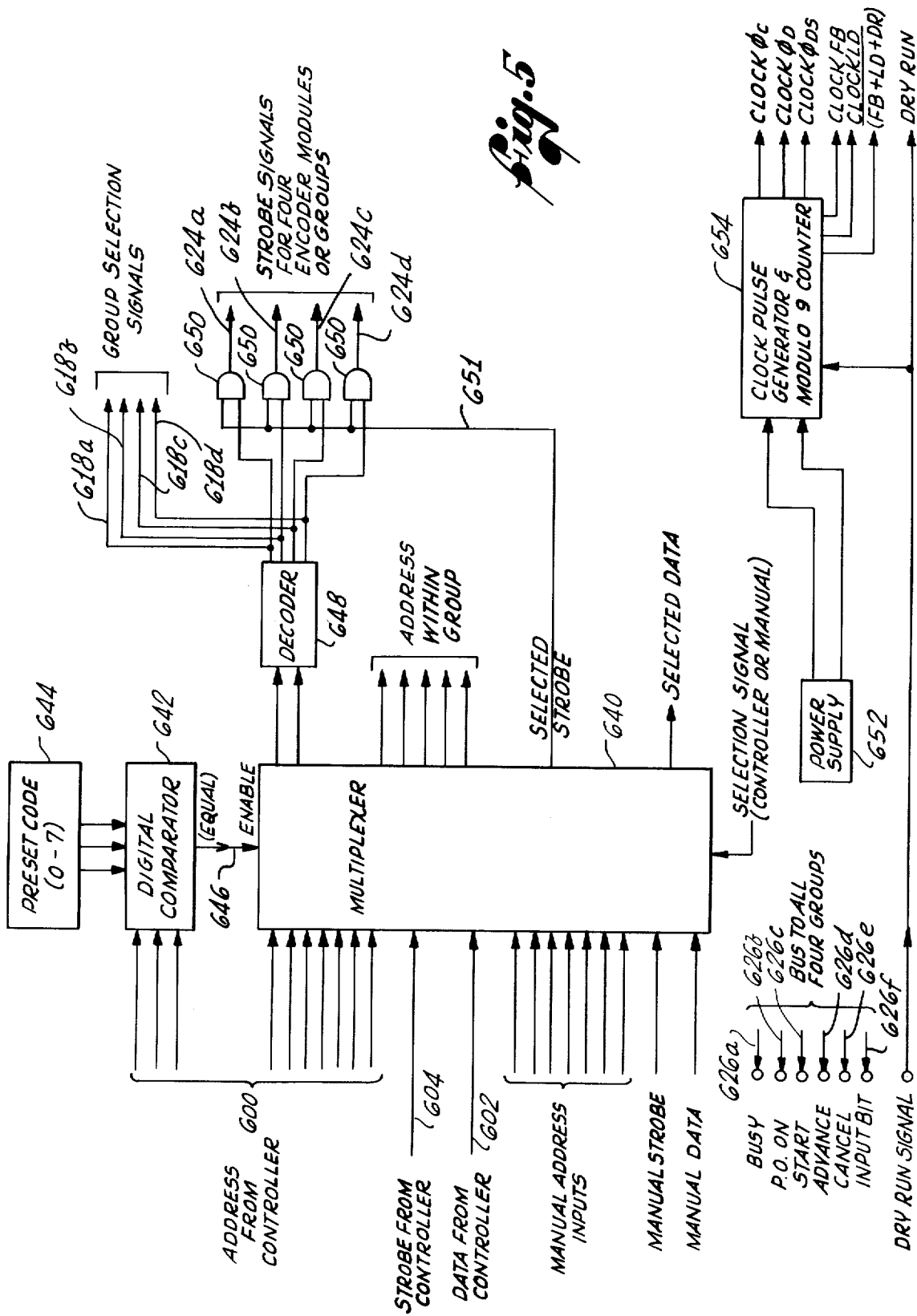
FIG. 5 is a block diagram of an encoder mother module used in the two-wire system of FIG. 4.

The encoder mother module 610 is illustrated in further detail in FIG. 5. The module 610 includes a multiplexer 640 for selecting a seven-bit address either from the controller 60 on bus 600 or from the manual override module 630, and for likewise selecting a data bit, either from the controller on line 602 or from the manual override module, and selecting a strobe signal either from the controller on line 604 or from the manual override module. As shown in FIG. 5, the three most significant bits of the address transmitted from the controller over lines 600 are connected to a digital comparator 642, wherein they are compared with a preset mother module code in the range 0–7, provided by the preset code indicated at 644. If the digital comparator 642 yields an equality signal on line 646, the multiplexer 640 is then enabled. In this manner, only one of the eight mother modules 610 will be enabled. The fourth and fifth most significant bits of the address, i.e., the first and second most significant bits of the seven-bit address emerging from the multiplexer 640, are connected to a decoder 648 which produces an output on one of its four output lines 618a–618d, and these provide the group selection signals transmitted to the encoder submodules 612a–612d. The group selection signals are also connected as inputs to four corresponding AND gates 650, the other inputs of which are provided by the selected strobe signal on line 651 from the multiplexer 640. The outputs of the AND gates 650 on lines 624a–624d are the group strobe signals for the four encoder submodules 612a–612d.

The encoder mother module 610 also includes a six-bit data bus, indicated at 626a–626f, for transmitting input signals from one of the encoder submodules 612 back to the six-bit input data bus 608. As indicated in FIG. 5, the data line 626a is used to convey a busy or not-busy status back to the controller 60. A busy status indicates that the selected encoder submodule 612 is already engaged in output operations, and is therefore not able to receive more data for output. The data line 626f is used to transmit an input data signal back to the controller 60. The input data may be indicative of the status of an output device, or may be indicative of the status of a sensing device in the field. The other four data lines 626b–626e all relate to operation of the portable operator 628. Line 626b is used to indicate whether or not the portable operator is connected to the particular selected encoder submodule 612. Lines 626c, 626d and 626e are used to transmit control signals originating at the portable operator 628. In particular, line 626c conveys a START signal indicating that a schedule is to be started, and line 626d conveys an ADVANCE signal, i.e., to indicate that the schedule is to be advanced from one step to the next. Finally, line 626e conveys a CANCEL signal, i.e., to indicate that the schedule is to be cancelled or terminated.

Although, in general, it will be apparent that any particular schedule is not limited to the control of valves or output devices associated with a particular group or encoder submodules, any schedule may be defined as being remotely controllable, by the portable operator 628 (FIG. 4), from a particular group. This definition or declaration in the schedule is made by means of the REMOTE CONTROL instruction, the only parameter of which is the particular group number from which the schedule may be remotely controlled.

The dry-run signal obtained from the latched output line 606 from controller 60 is also passed through the encoder mother module 610 and transmitted to all of the encoder submodules 612. Also included in the encoder mother module 610 is a power supply 652 and a clock pulse generator and modulo-nine counter 654, which generates the required clock pulses for operation of the encoder submodules 612. These clock pulses are shown graphically in FIGS. 8a–8f.

FIG. 8a shows the fundamental power supply frequency, at 50 or 60 Hertz. FIG. 8b shows a clock pulse train indicated as clock signal $\phi_C$. As will be seen, the clock pulses $\phi_C$ are square in form and are positive-going at and when the original power frequency waveform is negative-going. FIG. 8c illustrates a data clocking pulse indicated as clocking pulse $\phi_D$ which is the exact inverse of the clocking pulse $\phi_C$. FIG. 8d shows yet another clocking pulse referred to as $\phi_{DS}$, which is the same waveform as clocking signal $\phi_D$ but shifted, in fact delayed in phase by approximately 90°. FIG. 8e shows a feedback timing signal (FB) which is in a high state for one full power-frequency cycle in every eighteen cycles. FIG. 8f shows a timing pulse for loading data for transmission by the encoder submodule 612. The load data (LD) pulse also occurs for one full cycle in every eighteen cycles, and is displaced from the feedback timing signal (FB) by nine full cycles. Finally, FIG. 8g represents the logical OR combination of the feedback (FB) and load data (LD) signals, and therefore comprises a full-cycle positive-going pulse once in every nine full cycles.

The purpose of the clocking and timing signals illustrated in FIG. 8 will become apparent after a more detailed description of the encoder submodule and decoder operation. Basically, however, the theory of two-wire transmission is to transmit data by selectively clipping the original power-frequency signal during eight consecutive cycles, suppressing the power-frequency signal during the following full cycle, during which time a feedback signal may be transmitted, then transmitting eight undistorted power-frequency cycles, and suppressing the power-frequency signal for one following cycle, during which time a feedback signal relating to the portable operator 628 (FIG. 4) may be transmitted. Thus, the cycle of operations encompasses eighteen power-frequency cycles, as will become clear during the discussion of the encoder submodules and the decoder.

Figure 6:
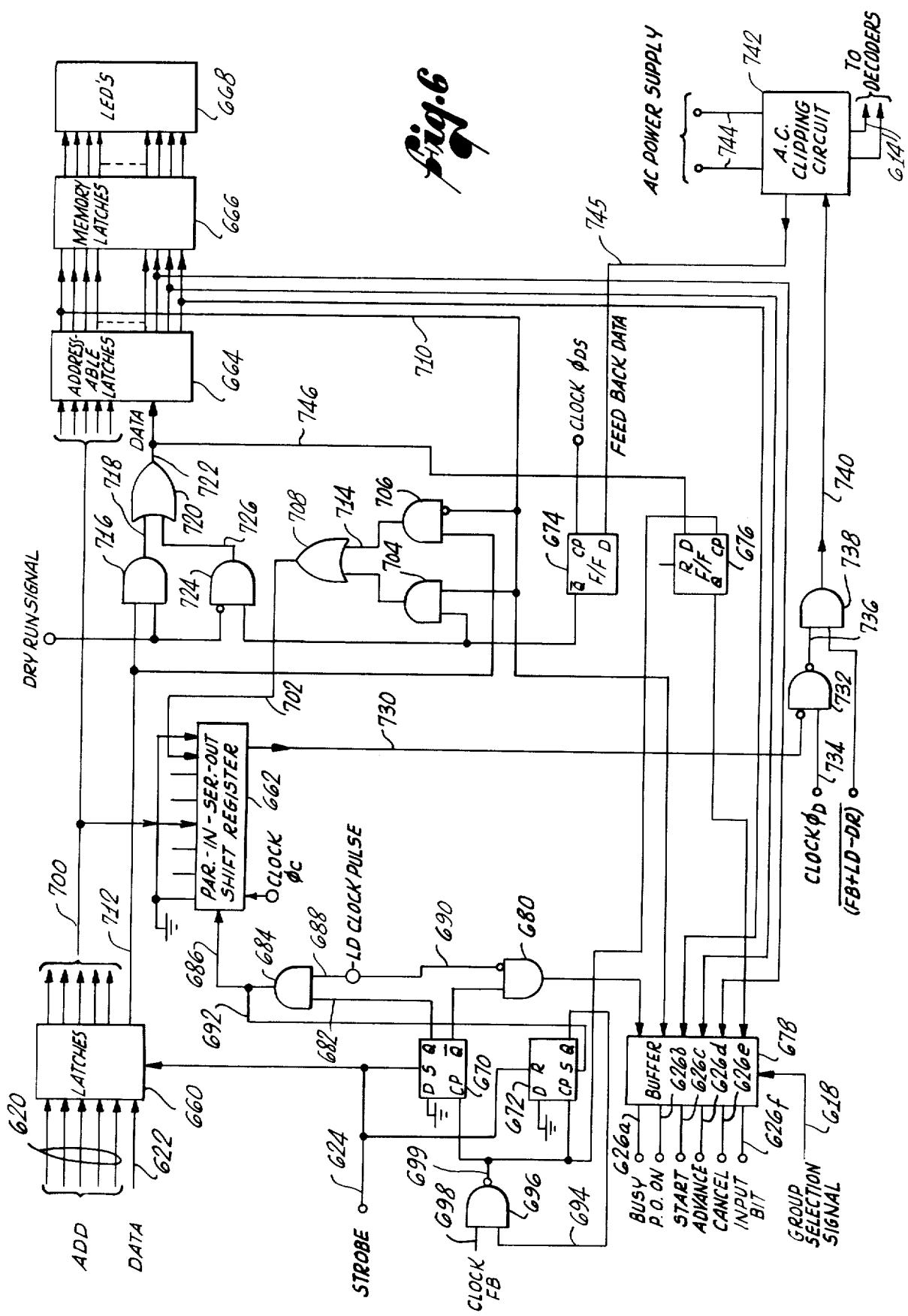
FIG. 6 is a schematic and block diagram of an encoder submodule used in the two-wire system of FIG. 4.

An encoder submodule 612 shown in more detail in FIG. 6. It includes a set of six latches 660 for receiving address information on lines 620 and data information on line 662, a parallel-input-serial-output shift register 662, a set of thirty-two addressable latches 664, a parallel set of memory latches 666, and a corresponding set of 32 light-emitting diodes 668. Also included are four D-type flip-flops which will be referred to as the busy flip-flop 670, the load flip-flop 672, the feedback data flip-flop 674 and the input data flip-flop 676, and other logical elements which will be introduced as the description proceeds. Data on the six input data lines 626a–626f are derived from a buffer 678 and, before data is transmitted to the encoder submodule 612, a group selection signal is transmitted over line 618 to the buffer, and the busy signal on line 626a is then examined to determine whether the encoder submodule is already busy transmitting data.

Assuming that a non-busy signal is indicated, a five-bit address is placed by the controller 60 on the address lines 620, and a one-bit data signal is impressed on line 622. Then, a strobe signal appears momentarily on line 624. The strobe signal on line 624 is connected to the strobe terminal of the latches 660, to the set terminal of the busy flip-flop 670, and to the reset terminal of the load flip-flop 672. Accordingly, when data is strobed into the latches 660, the busy flip-flop 670 is set and the load flip flop 672 is reset. The inverse output $\overline{Q}$ of the busy flip-flop 670 is connected as an input to an AND gate 680, the output of which is connected to the first bit position of the buffer 678, i.e., the busy bit position.

It will be apparent that, when the busy flip-flop is set, the inverse output is a logical zero, which is the level used to indicate a "busy" status on line 626a. The busy signal level will be transferred through AND gate 680 to the busy bit of the buffer 678 so long as the busy flip-flop 670 is set, and regardless of the presence or absence of the load pulse (LD). A busy signal will also be present on line 626a during load pulses, since it should not be possible to strobe new data into the latches 660 at the same time as it is being strobed out into the shift register 662.

The $\overline{Q}$ output of the busy flip-flop 670 is connected by line 682 to an input of another AND gate 684, the output of which is connected by line 686 to enable the parallel input operation of the shift register 662. The load clock pulse (LD) is connected by line 688 as another input to AND gate 684, and is also connected by line 690 as an inverted input to AND gate 680. The output of AND gate 684 is also connected, by line 692 to the set terminal of the load flip-flop 672. It will be apparent that when the load clock pulse (LD) occurs, the AND gate 684 will be enabled and a parallel load signal will be applied to the shift register 662, simultaneously setting the load flip-flop 672. The Q output from the load flip-flop 672 is connected by line 694 as an input to a NAND gate 696, the other input of which is provided by the feedback (FB) timing signal, as shown at 698. The output of the NAND gate 696, on line 699, is applied to the clocking terminals of the busy flip-flop 670, the load flip-flop 672 and the input data flip-flop 676. Consequently, when the next feedback signal (FB) occurs, indicating that the data in the shift register 662 has been clocked out serially, the NAND gate 696 will have logical ones on both of its inputs and a clocking signal will be produced at its output on line 699. Since the D terminals of the busy flip-flop 670 and the load flip-flop 672 are grounded, a clocking signal applied to those flip-flops results in their both being reset. Accordingly, a non-busy status will be reflected in the buffer 678, and the latches 660 will be able to receive more data over lines 620 and 622.

In summary, the line 626a will indicate a busy condition as soon as new data is strobed into the latches 660, and will remain busy until a load signal (LD) has occurred, and until the next following feedback signal (FB). When no data is being supplied to the latches 660, the line 626a remains non-busy at all times except during the load pulse (LD).

The address outputs of the latches 660 are connected, as shown by line 700, directly to five address positions in the shift register 662 and to the address terminals of the addressable latches 664. The outer-most parallel input bit positions of the shift register 662 are grounded, holding them at logical zeros, and the data bit position is derived over line 702 from a group of logical elements comprising two AND gates 704 and 706 and an OR gate 708. According to a convention employed in this two-wire system, device address zero is reserved for the use of the portable operator 628. When the portable operator is connected to the lines 614, transmission of a signal to device address zero will result in an "on" feedback signal returning during the feedback time cycle defined by the FB timing pulse. As will be described, feedback signals are gated into the addressable latches 664. Consequently, the zero position of the latches 664 will always contain an indication of whether the portable operator 628 is on line.

The zero-positioned latch in the latches 664 is connected by line 710 to the buffer position corresponding to line 626b, and is also connected as an input to AND gate 704, and as an inverted input to AND gate 706. The one-bit data line 712 from the latches 660 is also connected as an input to AND gate 706. Consequently, when the portable operator 628 is not on the line, as is usually the case, AND gate 706 has a logical one output, and this is transmitted over line 714 as an input to OR gate 708, the output of which is connected by line 702 to the data input position of the shift register 662. Accordingly, when the portable operator 628 is not on the line, the data output of the latches 660 on line 712 is applied directly to the data bit position of the shift register 662. When the portable operator 628 is on the line, AND gate 704 is enabled, and its other input is derived from the inverse Q output from the feedback data flip-flop 674. The output of AND gate 704 is applied also as an input to OR gate 708. Consequently, when the portable operator 628 is on the line, feedback data, rather than data from the controller 60, is applied to the data bit position of the shift register 662. The portable operator 628 transmits a one or "on" feedback signal during the LD pulse just before a transmission involving an output device which the portable operator intends to switch on, and transmits zero or "off" feedback signals before all other transmissions. The data input to the shift register, on line 702, will therefore be an "on" signal for the output device selected for switching on at the portable operator, and an "off" signal for all others.

The data output from the latches 660 on line 712 is also applied as an input to another AND gate 716, the other input of which is derived from the dry-run signal, and the output of which is applied over line 718 to an OR gate 720. The output of OR gate 720 on line 722 is the data input signal applied to the addressable latches 664. Accordingly, when the controller 60 is in dry-run mode, data outputs from the controller are fed directly to the addressable latches 664, and thence to the LED's 668. The dry-run signal is also inverted and applied to the input of another AND gate 724, the output of which is connected by line 726 as another input of the OR gate 720. The other input of AND gate 724 is derived from the inverse or $\overline{Q}$ output of the feedback data flip-flop 674. It will be apparent, then, that when the controller 60 is not in a dry-run mode, feedback data is gated from the feedback data flip-flop 674, through the AND gate 724 and the OR gate 720, to the latches 664.

The contents of the addressable latches 664 are connected directly to the memory latches 666, which may be optionally connected either to exactly track the conditions of the addressable latches 664, or to remain on once turned on. The latter alternative might be of use when the operator is away from the apparatus for some time, and wishes to see which valves were turned on in his absence. The LED's 668 are coupled directly to the memory latches 666 and represent the conditions of the memory latches.

When data is clocked out of the shift register 662, by a clock signal $\phi_C$, it is transmitted serially over line 730 and inverted before input to an NAND gate 732. The other input to NAND gate 732 is a clock signal clock $\phi_D$ as indicated at 734. The output of NAND gate 732 is connected by line 736 as an input to yet another AND gate 738 the output of which is connected by line 740 to an ac clipping circuit 742. Another input to AND gate 738 is provided by the clocking signal (FB+LD+DR). The AND gate 738 ensures that no data will be clocked to the ac clipping circuit 742 during the feedback pulse, or during the load pulse, or if the system is in dry-run mode. The ac clipping circuit 742 modifies the power-frequency signal supplied on lines 744, and transmits the clipped or modified signal over lines 614 to the decoders. The ac clipping circuit 742 operates to clip the positive-going portions of the power-frequency waveform to represent zero data, and to leave the positive-going portions unclipped to represent non-zero data. One detailed form of the ac clipping circuit 742 is disclosed in the aforementioned co-pending patent application, Ser. No. 644,535, now U.S. Pat. No. 4,131,882.

During the feedback time period, designated by the feedback timing signal FB, a feedback data signal is derived from the ac clipping circuit 742 on line 745, and connected to the D terminal of the feedback data flip-flop 674. As already described, the feedback data flip-flop 674 is used to provide data on line 722 to the latches 664, if the system is not in the dry-run mode. The data on line 722 to the latches 664 is also connected by line 746 to the D input of the input data flip-flop 676. The input data flip-flop 676 is clocked by a pulse on line 699 during the feedback timing period immediately following the transmission of data. The clocking pulse on line 699, it will be recalled, is derived from NAND gate 696. Accordingly, during the feedback cycle immediately following the transmission of data, the feedback data on line 722 is gated into the input data flip-flop 676, the Q output of which is connected to the input bit position of the buffer 678, for transmission on line 626f. It will be noted that, in dry-run mode, the data on line 722 to the addressable latches 664 will be derived directly from the data on line 622 from the controller. Accordingly, when in the dry-run mode, data transmitted from the controller will be fed back immediately as the input data signal on line 626f.

Figure 7:
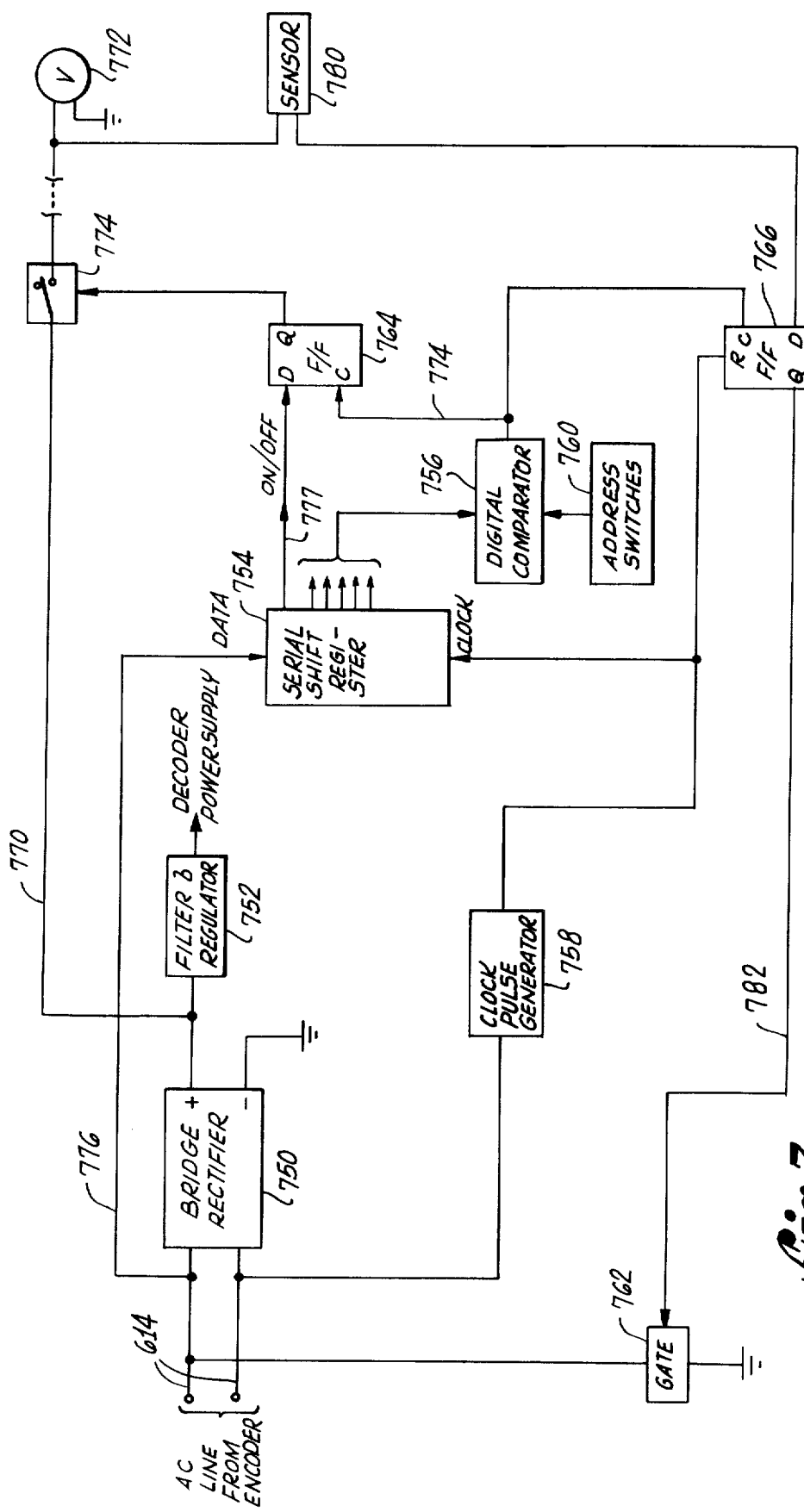
FIG. 7 is a schematic and block diagram of a decoder module used in the two-wire system of FIG. 4.

FIG. 7 shows a typical decoder in more detail. The decoder includes a bridge rectifier 750, a filter and regulator 752, a serial shift register 754, a digital comparator 756, a clock pulse generator 758, a set of address switches 760, a feedback control gate 762 and two D-type flip-flops 764 and 766. The ac line from the encoder (lines 614) are connected to the input of the bridge rectifier 750, the negative output of which is grounded, as shown at 768, and the positive output of which is connected to the filter and regulator 752, from which the decoder power supply is derived. The positive output of the bridge rectifier 750 is also connected by line 770 to a valve 772 to be controlled through a controllable power switch 774, such as the one described in detail in the aforementioned co-pending application Ser. No. 644,635. The other terminal of the valve 772 is connected to ground. The bridge rectifier 750 operates to separate data signals, which are positive-going, from clocking signals, which are negative-going, on the ac line. The data signals are transmitted over line 776 from one input of the bridge rectifier 750, and are connected to supply serial input signals to the shift register 754. The clock signals are derived from the other ac line, and are shaped by the clock pulse generator 758, and then utilized to clock the serial shift register 754.

The contents of the serial shift register 754 are continually compared in the digital comparator 756 with the contents of the address switches 760. Data is transmitted in eight-bit blocks, the two outer bits being zeros, and the remaining six-bits containing the address and data information. The digital comparator 756 looks for zeros in the outer bit positions of the shift register 754 and for the address set in the address switches 760 in the address positions of the shift register. When a match is found, a signal is generated on line 774 from the digital comparator 756, and this is transmitted to the clocking terminals of the flip-flops 764 and 766. Flip-flop 764 receives its D input over line 777 from the data bit position of the serial shift register 754. Accordingly, when the digital comparator 756 finds an address match, the data bit in the transmission is gated into the flip-flop 764. The Q output of flip-flop 764 is used to control the power switch 774 which, in turn, controls the on/off state of the valve 772.

Feedback data indicative of the valve condition is obtained over line 778 connected to the positive side of the valve 772. Line 778 may be connected directly the D terminal of flip-flop 766 or may, as shown in FIG. 7, be connected to the D terminal through a sensor 780. The sensor 780 is essentially a switch closable upon the sensing of a specific condition, such as a minimum water pressure in the pipe line, for example. The Q output of flip-flop 766 is connected by line 782 to control the gate 762 which, when closed, grounds one of the ac lines 614.

When a transmission to a decoder is complete, and has been recognized as intended for this particular decoder, the clocking signal generated on line 774 from a digital comparator 756 will clock the feedback condition into the flip-flop 766. This will occur at the start of the feedback time period immediately after transmission of the data. During the feedback time period, the gate 762 will ground one of the power lines 614 to indicate an "on" condition, and will be left open-circuited to indicate an "off" condition. It will be apparent that the valve 772 can be omitted, and the decoder and sensor 780 will then function purely as a sensing device, rather than as an output device with feedback.

It will be appreciated from the foregoing description that the present invention represents a significant advance in the irrigation field. In particular, it provides an extremely powerful interactive control system which an operator can conveniently program and monitor through a control panel, using an irrigation-oriented language. Moreover, the control system of the invention is inherently very reliable, and, when properly used, provides significant savings in water usage. It will also be appreciated that, although a particular embodiment of the invention has been described and illustrated in detail, various changes and modifications may be made without departing from the spirit and scope of the invention. Accordingly, the invention is not to be limited except as by the appended claims.

We claim:

1. An interactive irrigation control system comprising:
    digital control means for controlling a plurality of irrigation valves in accordance with a plurality of independent and repeatable schedules of instructions; and
    means for creating or modifying schedules of instructions concurrently with, and without disrupting, operation of said digital control means, said means for creating or modifying schedules of instructions including
    schedule storage means, for storing a plurality of schedules of instructions for control of the irrigation valves,
    operator input and output means, and
    operator input/output service means, for interpreting operator instructions and deriving therefrom schedules for storage in said schedule storage means, and for initiating operator output messages, said operator input/output service means being operable simultaneously with, and without disruption of said digital control means, to provide operator communication without disturbing execution of the schedules of instructions.

2. An interactive irrigation control system as set forth in claim 1, wherein said digital control means includes:
    means for receiving input signals indicative of sensed physical field conditions; and
    means for selectively conditioning execution of said schedules of instructions upon the detection of specified input conditions, as defined in instructions in the schedules.

3. An interactive irrigation control system as set forth in claim 1, wherein said digital control means includes:
    means for receiving input signals indicative of sensed physical field conditions; and
    means for recording the status of selected ones of said input signals in accordance with instructions in said schedules.

4. An interactive irrigation control system as set forth in claim 1, wherein said means for creating or modifying schedules includes means for modifying parameters of an instruction during its execution.

5. An irrigation control system comprising:
    digital output means for transmitting control signals to a plurality of irrigation valves;
    digital input means for receiving control signals from a plurality of sensing devices;
    schedule storage means, for storing a plurality of schedules of instructions for control of the irrigation valves;
    clock means for timing operations relating to the irrigation valves; and
    schedule service means for interpreting the schedule instructions and accordingly communicating with said digital output and input means, to control operation of the valves in accordance with the schedule instructions and conditioned upon the status of selected input conditions, as also specified in the instructions;

operator input and output means; and operator input/output service means, for interpreting operator instructions and deriving therefrom schedules for storage in said schedule storage means, and for initiating operator output messages, said operator input/output service means being operable simultaneously with, and without disruption of said schedule service means, to provide operator communication without disturbing execution of the schedules of instructions.

6. An irrigation control system as set forth in claim 5, wherein:

said digital output means includes an output buffer;

said digital input means includes an input buffer;

said schedule service means stores output signals in said output buffer and retrieves input signals from said input buffer;

said digital output and input means together include digital input/output service means for transferring data out of said control system from said output buffer and into said control system through said input buffer.

7. An irrigation control system as set forth in claim 6, wherein:

said schedule service means is activated relatively frequently and executes each active schedule of instructions from its first to its current instruction, thereby refreshing said output buffer frequently;

said digital input/output service means operates essentially continuously, to output the contents of said output buffer repeatedly, whereby the valves are maintained reliably in their desired conditions.

8. An irrigation control system as set forth in claim 5, wherein said operator input/output service means also includes means for modifying the mode of execution of a selected schedule in accordance with operator instructions received through said operator input means.

9. An irrigation control system as set forth in claim 8, wherein said means for modifying the mode of execution includes means for initiating, terminating and interrupting execution of a selected schedule.

10. An irrigation control system as set forth in claim 8, wherein said means for modifying the mode of execution includes means for modifying a real-time parameter of an instruction in a selected schedule.

11. An irrigation control system as set forth in claim 8, wherein said means for modifying the mode of execution includes means for modifying the number of times that a selected schedule will be automatically repeated before termination.

12. An irrigation control system as set forth in claim 8, wherein said means for modifying the mode of execution includes means for modifying a water budgeting factor in a selected schedule, the water budgeting factor being applied as a multiplier to quantitative watering-time parameters specified in the schedule instructions.

13. An irrigation control means as set forth in claim 5, wherein said operator input/output service means also includes means for monitoring schedules during their execution by said schedule service means.

14. A method for controlling a plurality of switchable irrigation valves, comprising the steps of:

controlling the valves by generating digital valve control signals in accordance with the execution of a plurality of independent and repeatable schedules of instructions; and modifying selected schedules of instructions through an operator control panel, concurrently with said controlling step, and without disrupting execution of the schedules of instructions, said modifying step including receiving operator inputs relating to schedule modifications and additions, interpreting the operator inputs resulting from said receiving step and deriving therefrom new or modified schedules for storage in the storage module, outputting messages to the operator in response to the operator inputs and to the stored schedules, and modifying the operating mode and parameters of a schedule in response to said receiving step, wherein said steps of receiving and interpreting operator inputs, and said steps of outputting and modifying are all performed essentially simultaneously with said step of controlling the valves.

15. A method for controlling a plurality of switchable irrigation valves as set forth in claim 14, wherein said controlling step includes:

receiving input signals indicative of sensed field conditions; and selectively conditioning execution of the schedules of instructions upon the detection of specified sensed input conditions, as defined in the schedules.

16. A method for controlling a plurality of switchable irrigation valves as set forth in claim 14, wherein said controlling step includes:

receiving input signals indicative of sensed field conditions; and recording the status of selected ones of the input signals in accordance with instructions in the schedules.

17. A method for controlling a plurality of switchable irrigation valves as set forth in claim 14, wherein said modifying step includes modifying instruction parameters in a currently executing schedule.

18. A method for controlling a plurality of switchable irrigation valves, comprising the steps of:

storing a plurality of schedules of instructions relating to the control of the valves in a storage module;

interpreting the stored schedules of instructions and generating therefrom digital data corresponding to desired conditions of the valves;

outputting the digital data to control the conditions of the valves;

inputting signals indicative of sensed field conditions;

conditioning further execution of said interpreting step upon the detection of selected sensed input conditions, as specified in the schedule instructions;

receiving operator inputs relating to schedule modifications and additions;

interpreting the operator inputs resulting from said receiving step and deriving therefrom new or modified schedules for storage in the storage module;

outputting messages to the operator in response to the operator inputs and to the stored schedules; and modifying the operating mode and parameters of a schedule in response to said receiving step, wherein said steps of receiving and interpreting operator inputs, and said steps of outputting and modifying are all performed essentially simultaneously with said steps of interpreting stored signals, outputting digital data, and inputting signals.

19. A method for controlling a plurality of switchable irrigation valves as set forth in claim 18, wherein said step of outputting the digital data includes:
storing the digital data in an output buffer; and
repeatedly and frequently outputting the digital data to maintain the valves reliably in their intended conditions.

20. A method for controlling a plurality of switchable irrigation valves as set forth in claim 18, wherein said step of interpreting the operator inputs includes modifying the mode of execution of a selected schedule in accordance with a command from the operator.

21. A method for controlling a plurality of switchable irrigation valves as set forth in claim 20, wherein said modifying step includes initiating, terminating or interrupting execution of a selected schedule.

22. A method for controlling a plurality of switchable irrigation valves as set forth in claim 20, wherein said modifying step includes modifying a parameter of a selected instruction which is currently being executed.

23. A method for controlling a plurality of switchable irrigation valves as set forth in claim 20, wherein said modifying step includes modifying a water budgeting factor in a selected schedule, the water budgeting factor being applied as a multiplier to quantitative watering-time parameters specified in the schedule instructions.

24. An interactive irrigation control system comprising:
control means having
a digital output buffer for storing output data signals to be transmitted to a plurality of valves,
a digital input buffer for storing input data signals indicative of sensed field conditions,
schedule storage means for storing at least one schedule of instructions for control of the valves,
a clock for timing operation of the valves,
schedule service means for interpreting each schedule on a periodic basis and generating output signals for storage in said digital output buffer in accordance with the schedule instructions and the input signals in said digital input buffer,
digital input and output servicing means for repeatedly outputting the contents of said output buffer and for inputting data into said input buffer,
operator input and output means to allow an operator to create, delete and modify schedules during operation of said schedule service means and said digital input and output servicing means, and
operator input/output processing means for processing operator commands, generating operator output responses thereto and manipulating schedules in accordance with the operator commands; and
two-wire encoding means coupled to said control means and including
a plurality of encoder submodules, and
encoder submodule selection means responsive to data address signals received from said control means to select an appropriate encoder submodule for activation,
wherein each encoder submodule includes means for encoding addresses and on/off signals into an alternating-current power signal for transmission along a pair of wires to a plurality of addressable decoders, and means for receiving and decoding feedback signals from the decoders, for input by said controller.

25. An interactive irrigation control system as set forth in claim 24, wherein:
said schedule service means services each active schedule periodically from the first instruction to the currently executing instruction, and thereby frequently regenerates an accurate output image; and
said digital input and output servicing means operates on an essentially continuous basis to output the data image repetitively and as rapidly as said two-wire encoding means will permit, and to input data at essentially the same rate.

26. An interactive irrigation control system comprising:
digital control means for controlling a plurality of irrigation valves in accordance with a plurality of independent and repeatable schedules of instructions; and
means for creating or modifying schedules of instructions concurrently with, and without disrupting, operation of said digital control means;
and wherein said digital control means includes
output buffer means, for holding a digital image of the conditions of the irrigation valves,
means for renewing the contents of said output buffer means repeatedly at relatively short time intervals, and
means for continually outputting the contents of said output buffer means, to maintain the valves in the desired conditions at all times.

27. A method for controlling a plurality of switchable irrigation valves, comprising the steps of:
controlling the valves by generating digital valve control signals in accordance with the execution of a plurality of independent and repeatable schedules of instructions; and
modifying selected schedules of instructions through an operator control panel, concurrently with said controlling step, and without disrupting execution of the schedules of instructions;
and wherein said controlling step includes
storing in an output buffer a digital output image of the intended conditions of the valves,
renewing the contents of the output buffer repeatedly at relatively short time intervals, and
continually outputting the contents of the output buffer to ensure that the valves are switched to and remain in their intended positions.

* * * * *

UNITED STATES PATENT AND TRADEMARK OFFICE
CERTIFICATE OF CORRECTION

PATENT NO. : 4,176,395
DATED : November 27, 1979
INVENTOR(S) : RENE H. EVELYN-VEERE and RICHARD L. RUGGLES It is certified that error appears in the above-identified patent and that said Letters Patent are hereby corrected as shown below:

Column 12, line 10, "suchn" should be --such--;
in the Table 1, under the heading "Key Sequence" line 5, "Enter$^2$" should be --Enter$^1$--. (superscripts not subscripts)

Column 22, line 39, "valve" should be --value-- (both occurrences).

Column 25, line 3, "he" should be --the--.

Column 32, line 26, "flip flop" should be --flip-flop--.

Column 33, line 45, "Q" should be --$\overline{Q}$--.

Column 35, line 44, after "directly" insert --to--.

Signed and Sealed this

Eighth Day of July 1980

[SEAL]

Attest:

SIDNEY A. DIAMOND

Attesting Officer

Commissioner of Patents and Trademarks